United States Patent [19]

Matson

[11] Patent Number: 4,778,688

[45] Date of Patent: Oct. 18, 1988

[54] PRODUCTION OF LOW-ETHANOL BEVERAGES BY MEMBRANE EXTRACTION

[75] Inventor: Stephen L. Matson, Harvard, Mass.

[73] Assignee: Sepracor, Inc., Marlborough, Mass.

[21] Appl. No.: 786,787

[22] Filed: Oct. 11, 1985

[51] Int. Cl.$^4$ ............................................. C12G 3/10
[52] U.S. Cl. ............................ 426/425; 210/321.89; 426/478; 426/492
[58] Field of Search ............... 426/271, 592, 386, 425, 426/478, 492, 493; 210/645, 643, 648, 634, 644, 651

[56] References Cited

U.S. PATENT DOCUMENTS

| | | | |
|---|---|---|---|
| 2,611,490 | 9/1952 | Robinson | 210/651 |
| 3,186,917 | 6/1965 | Gerhardt et al. | |
| 3,291,613 | 12/1966 | Raible | |
| 3,335,545 | 7/1965 | Robb et al. | 55/16 |
| 3,502,651 | 3/1970 | Oldenburg | |
| 3,552,574 | 1/1971 | Lowe et al. | |
| 3,847,163 | 11/1974 | Molyneux | 210/651 |
| 3,865,960 | 2/1975 | Wucherpfennig et al. | |
| 3,865,961 | 2/1975 | Wucherpfennig | |
| 3,915,820 | 10/1975 | Kominek | |
| 3,956,112 | 5/1976 | Lee et al. | 210/644 |
| 4,015,020 | 3/1977 | Nagasawa et al. | |
| 4,083,904 | 4/1978 | Sano et al. | |
| 4,218,312 | 8/1980 | Perry | |
| 4,401,678 | 8/1983 | Beaumont | |
| 4,499,117 | 2/1985 | Bonneau | 426/493 |
| 4,532,140 | 7/1985 | Bonnome | 426/592 |
| 4,539,117 | 9/1985 | Meyer | 210/651 |
| 4,581,236 | 4/1986 | Bandel et al. | 426/592 |
| 4,610,791 | 9/1986 | Henne et al. | |
| 4,610,887 | 9/1986 | Galzy et al. | 426/490 |
| 4,612,196 | 9/1986 | Goldstein | 426/490 |
| 4,617,127 | 10/1986 | Light | 210/651 |
| 4,655,927 | 4/1987 | Ford | 210/651 |

FOREIGN PATENT DOCUMENTS

| | | |
|---|---|---|
| 28769 | 5/1981 | European Pat. Off. |
| 1585376 | 1/1970 | France ......... 210/651 |
| 51-26399 | 8/1976 | Japan |
| 53-24568 | 9/1979 | Japan |
| 1079517 | 8/1967 | United Kingdom |
| 1177126 | 1/1970 | United Kingdom |
| 1447505 | 8/1976 | United Kingdom |

OTHER PUBLICATIONS

Beuley, 1977, The Treatment of Waste Emulsified Oils by Ultrafiltration, Filtration and Separation, Jan./Feb. 1977, pp. 53–55.
Jameson, T. A.: Meltzer, T. H. "A Review of Cellulosic Membrane Applications to Air, Water and Biological Fluids Filtration," *Appl. Polym. Symp.* 1970, 13, 267–283.
"Hollow-Fiber Membranes," Kirk-Othmer, *Encyclopedia of Chemical Technology*, Third Edition, vol. 12, pp. 492–513 (1984).
"Reverse Osmosi," Kirk-Othmer, *Encyclopedia of Chemical Technology*, Third Edition, vol. 20, pp. 230–242 (1984).

(List continued on next page.)

*Primary Examiner*—Donald E. Czaja
*Assistant Examiner*—Carolyn Paden
*Attorney, Agent, or Firm*—Pennie & Edmonds

[57] ABSTRACT

Low-ethanol wines and other alcoholic beverages are produced by treating ordinary alcoholic beverages with novel membrane extraction methods. Semipermeable membranes and extraction fluids comprised either of a non-toxic, water-immiscible organic solvent or an aqueous solution of a low-molecular-weight but membrane-impermeable solute are used under mild conditions to selectively extract ethanol from alcoholic beverages, while leaving substantially intact the complement of other organic constituents that contribute to the color, aroma, and taste of the beverage. The methods disclosed may be adapted to continuous processing of alcohol-containing beverages, in which an ethanol-rich product is continuously recovered from the organic or aqueous extraction fluid and the latter is continuously regenerated and subsequently recycled to the membrane extraction unit.

36 Claims, 4 Drawing Sheets

OTHER PUBLICATIONS

"In Search of the Perfect Membrane," *High Technology* 1983, Nov., 72.

Staude, E. "Polymere fur die Separation mit Membranen," *Die Angewandte Makromolekulare Chemie* 1982, 109/110, 139–164.

Pusch, W.; Walch, A. "Synthetic Membranes-Preparation, Structure, and Application," *Angew. Chem. Int. Ed. Engl.* 1982, 21, 660–685.

Kesting, R. E. *Synthetic Polymeric Membranes*, Puropore Incorporated, Tustin, Calif., pp. 4–5, 296–299 (1981).

Huang, R. Y. M.; Jarvis, N. R. "Separation of Liquid Mixtures by Using Polymer Membranes. II. Permeation of Aqueous Alcohol Solutions Through Cellophane and Poly(Vinyl Alcohol)," *J. Appl. Polm. Sci.* 1970, II, 2341–2356.

Tealdo, G. C.; Canepa, P.; Munari, S. "Water-Ethanol Permeation Through Grafted PTFE Membranes," *J. Memb. Sci.* 1981, 9, 191–196.

Wilke, C. R.; Maiorella, B. "High Productivity Anaerobic Fermentation with Dense Cell Culture," *Adv. Biotechnol., (Proc. Int. Ferment. Symp.)* 1981, 1, 539–545.

Kyung, K. H.; Gerhardt, P. "Continuous Production in Ethanol by Yeast 'Immobilized' in a Membrane-Contained Fermentor," *Biotechnol. Bioeng.* 1984, 26, 252–256.

Gregor, H. P.; Jeffries, T. W. "Ethanolic Fuels from Renewable Resources in the Solar Age," *Ann. N.Y. Acad. Sci.* 1979, 326, 273–287.

Meltzer, T. H.; Gutfreund, K.; Kulshrestha, V. K.; Stake, A. M. "Optimized Cellulose Membranes for Artificial Kidney Dialysis Applications," *Trans. Amer. Soc. Artif. Int. Organs.* 1968, 14, 12–18.

Klein, E.; Holland, F.; Lebeouf, A.; Donnaud, A.; Smith, J. K. "Transport and Mechanical Properties of Hemodialysis Hollow Fibers," *J. Memb. Sci.* 1976, 1, 371–396.

"Dextrose and Starch Syrups," Kirk-Othmer, *Encyclopedia of Chemical Technology*, Third Edition, vol. 7, pp. 564–577 (1984).

Symbas, P. N.; Tyras, D. H.; Baldwin, B. J. "Left Ventricular Function During Acute Ethanol Intoxication and Hemodialysis," *J. Surgical Res.* 1973, 15, 207–211.

Gardner, C. R. "Biomedical Applications of Membrane Processes," in *Membrane Separation Processes* Meares, P., Ed., Elsevier Scientific Publishing Company, Amsterdam, pp. 540–542 (1976).

Colton, C. K.; Lowrie, E. G. "Hemodialysis: Physical Principles and Technical Considerations," in The Kidney 2nd Edition, Brenner, B. M.; Rector, Jr., F. C., Eds., vol. II, pp. 2425–2474 (1981).

Margaritis, A.; Wilke, C. R. "The Rotorfermentor. I. Description of the Apparatus, Power Requirements, and Mass Transfer Characteristics," *Biotechnol. Bioeng.* 1978, 20, 709–726.

Margaritis, A.; Wilke, C. R. "The Rotorfermentor. II. Application to Ethanol Fermentation," *Biotechnol. Bioeng.* 1978, 20, 727–753.

Michaels, A. S. "New Separation Technique for the CPI," *Chem. Engin. Prog.* 1968, 64, 31–43.

Lonsdale, H. K. "The Growth of Membrane Technology," *J. Memb. Sci.* 1982, 10, 81–181.

Messing, R. A. "The Potential Applications of Molecular Inclusion to Beer Processing," *The Brewers Digest* 1971, Dec., 60–63.

Harrison, P. S. "Reverse Osmosis and Its Applications to the Food Industry," *Food Trade Review* 1970, Nov., 33–37.

Porter, M. C.; Michaels, A. S. "Membrane Ultrafiltration," *Chem. Tech.* 1971, Jan., 56–63.

Pierrard, P. "Recents Progres en Electrodialyse," *Industries Aliment. Agric.* 1976, 569–581.

Shpritsman, E. M.: Gavrilyuk, V. S. "Controlling Wine Acidity by Electrodialysis," *Sadovod. Vinograd. Vinodel. Mold.* 1975, 30(4), 25–28.

Ng, P. K.: Mitra, G.; Lundblad, J. L. "Simultaneous Salt and Ethanol Removal from Human Serum Albumin," *J. Pharmaceut. Sci.* 1978, 67(3), 431–433.

Jaeger, P.; Puespoek, J. "Low-Alcohol Beers and Low-Alcohol Beverages with Beer Character," *Mitt. Versuchsstn. Gaerungsgewerbe Wien* 1978, 32(3-3), 36–40.

Niefind, H. J. "Practical Experiences with Dialysis for the Production of Low Alcohol Beer," *Monatsschrift fur Brauerei* 1982, 35(3), 95–97.

Niefind, H. J.; Schmitz, F. J. "New Process for Reducing Alcohol Content of Beer by Selective Diffusion Through Membranes," *Proceedings, European Brewery Convention* 1981, 599–606.

(List continued on next page.)

OTHER PUBLICATIONS

Wucherpfennig, K.; Neubert, S. "Zur Teilweisen Entalkoholisierung von Bier Mittels Umkehrosmose," *Brauwelt Jg.* 1976, 116(47), 1573–1579.

Postel, W.; Prasch, E. "Untersuchungen zur Weinsteinstabilisierung von Wein durch Elektrodialyse," *Die Weinwirtschaft* 1978, 1/2, 28–32.

Paronetto, L.; Paronetto, L.; Braido, A. "Alcune Prove di Stabilizzazione Tartarica di Mosti e Eini Mediante l'Elettrodialisi," *Vignevini* 1977, 4(11), 9–15.

Wucherpfennig, K.; Millies, K. D., "Uber den Einfluss der Elektrodialysebehandlung zum Zwecke der Weinsteinstabilisierung auf die Konzentration der Aminosauren im Wein," *Mitteilungen: Rebe, Wein, Obstbau und Fruechteverwertung* 1976, 26(1), 13–26.

Wucherpfennig, K. "Possibilities d'Application de Procedes Utilisant des Membranes pour la Stabilisation des Vins (Ultrafiltration, Osmose Inverse, Electrodialyse)," *Ann. Technol. Agric.* 1978, 27(1), 319–331.

Wucherpfennig, K. "Possibilites d'Utilisation de Processus Membranaires dans l'Industrie des Boissons (Osmose Inverse, Ultrafiltration, Electrodialyse)," *Bulletin de l'O.I.V.* 1980, 589, 187–208.

Mercz, A. "Applications of Membrane Processes in Winemaking," *Borgazdasag* 1976, 24(2), 55–60.

Toth, M. "Use of Autoanalyzer for Analytical Measurements in the Beer Industry. IV.," *Soripar* 1979, 26, 18–24.

Coulman, G. A.; Stieber, R. W.; Gerhardt, P. "Dialysis Continuous Process for Ammonium–Lactate Fermentation of Whey: Mathematical Model and Computer Simulation," *Appl. Environ. Microbiol.* 1977, 34(6), 725–732.

PRODUCTION OF LOW-ETHANOL BEVERAGES BY MEMBRANE EXTRACTION

FIELD OF THE INVENTION

This invention relates to novel methods for the production of wine and other ethanol-containing mixtures that are low in ethanol content. More particularly, membrane extraction systems are described which selectively remove ethanol from wine and other beverages while retaining the water and numerous other organic constituents that contribute to the color, bouquet and flavor of the beverage.

The methods of this invention offer substantial advantages over previously available methods which use immature grapes, arrested fermentation, or evaporative processes, all of which tend to produce low-alcohol beverages.

Additionally, the invention has applicability to the removal of other organic solutes from aqueous mixtures in cases where it is necessary or desirable to minimize the quantity of water that is simultaneously removed.

BACKGROUND OF THE INVENTION

In recent years there has been an increasing interest in alcoholic beverages with a reduced alcohol content. As a result, numerous low-alcohol beers have appeared on the market, and there have been similar efforts to produce "light" wines. When first introduced, light wines accounted for about 10% of the total $7 billion (550 million gallon) U.S. wine market. Largely because of problems with the presently available methods for producing light wines and resultant poor quality, however, sales of such wines have fallen to 3% of total wine sales.

Production of low-alcohol beers has not proven to be difficult since the chemistry of beer production is relatively simple compared to that of wine, and beer can tolerate rougher treatment. Thus, light beer may be produced by boiling regular beer for a number of hours to drive off much of the alcohol Hoyrup, "Beer," in Kirk-Othmer *Encyclopedia of Chemical Technology*, Vol. 3, pp. 692-735 (3rd Ed. 1978). Such protracted heating of wine would degrade many of the constituents that contribute to its flavor, color and bouquet. With beer, flavor that is lost by boiling may be restored to some degree by the addition of aroma substances recovered from yeast (German Pat. No. 1,767,040), but there is no such simple remedy for the restoration of flavor to thermally damaged wine.

The boiling of beer to remove alcohol also causes a substantial loss of water. That poses no problem for beer because it can simply be reconstituted by the addition of replacement water. Dilution of wine or distilled spirits with make-up water, however, is restricted or prohibited by the U.S. Bureau of Alcohol, Tobacco, and Firearms. 49 Fed. Reg. 37510-37530, (Sept. 24, 1984). Other methods for producing low-alcohol beer that also cause the removal of water, such as vacuum distillation and reverse osmosis, are not applicable to wine because of this prohibition. Where the ethanol content of distilled spirits such as whiskeys is reduced by dilution with water, the product must be labelled as "diluted," and this is undesirable from a marketing standpoint.

Yet another process for reducing the alcohol content of beer involves the dialysis of beer using cellulosic dialysis membranes. Moonen, H. and H. J. Niefind, "Alcohol Reduction in Beer by Means of Dialysis," *Desalination*, Vol. 41, p.327-335 (1982). In this process, beer and water flow countercurrently on opposite sides of a dialysis membrane, and alcohol from the beer stream diffuses across the membrane to be swept away at low concentration in the water (or "dialysate") stream. Unfortunately as regards the production of light wines, however, simple dialysis of wine against water across relatively non-selective dialysis membranes would not only remove ethanol but would also remove many low- to middle-molecular-weight solutes essential to the flavor and bouquet of a wine. Additionally, an osmotically-driven diffusive flux of water from the dialysate side to the wine side of the membrane could be expected to occur, and such a water flux would constitute a form of dilution or "reconstitution" of the beverage.

Efforts have been made to produce low-ethanol wine through the use of low-sugar grapes or by premature curtailment of the fermentation process, but the complexity and quality of the product are adversely affected.

A better process has been described by Boucher in U.S. Pat. No. 4,405,652, in which fully mature wine is subjected to flash evaporation under vacuum in a heated centrifugal evaporator. Because the wine is spun into a thin film, from which rapid ethanol evaporation takes place, and because the evaporation process is conducted under a vacuum of 27-29 inches Hg, degradation of the wine is reduced. Nevertheless, there may be some thermal destruction since the wine is heated to 98°-100° F., and in fact wine processed in this manner is said to exhibit a characteristic and undesirable "burnt" taste.

Additionally, other volatile components that may be important to the flavor, color or bouquet of the wine may be lost during the evaporation phase of the process. Finally, the product claimed by Boucher is only modestly reduced in ethanol content to about 7.1 volume percent from an original wine alcohol content of 10.8 volume percent.

Pressure-driven membrane processes such as reverse osmosis, ultrafiltration, and pervaporation, even if they were carried out at low temperatures (under relatively high vacuum in the case of pervaporation) and with suitably ethanol-permselective membranes, might in fact be sufficiently non-destructive to wine, but such processes would also remove excessive quantities of water and concentrate the alcoholic beverage in the process. As previously noted, lost water cannot simply be replaced in wine with water from an external source. Additionally, the high osmotic pressure differences that would be encountered in the production of a high-purity ethanol permeate from such relatively ethanol-poor mixtures as wine (10-12 volume percent ethanol) and whiskeys (40 volume percent ethanol) would make reverse osmosis both technically and economically unfeasible. Indeed, at the present time reverse osmosis is more typically applied to the task of concentrating ethanol in aqueous mixtures by removal of water therefrom than it is applied to the selective removal of ethanol from such mixtures.

Conventional solvent extraction technology has long been applied to the recovery of ethanol from aqueous solutions in industry. Scheibel, E. G., "Dehydration of Ethyl Alcohol by Fractional Liquid Extraction," *Industrial & Engineering Chemistry*, Vol. 42, p. 1497-1508 (1950). This technology, however, is not directly applicable to the production of low-alcohol wines or other beverages. There would invariably be excessive solubility of the extraction solvent in the wine and, hence, contamination. Emulsification and physical entrainment might also occur. Hartline, F. F., "Lowering the Cost of Alcohol," *Science,* Vol. 206, pp. 41–42 (1979). Furthermore, with most extraction solvents it would be expected that numerous other organic constituents of the wine would be coextracted with the ethanol, thereby creating a wholly unacceptable product.

Membrane solvent extraction, in which a membrane is interposed between a solvent containing a solute to be extracted and a second, immiscible extraction solvent, prevents the solvent entrainment and emulsion formation problems inherent to conventional solvent extraction technology. For example, Kim, in U.S. Pat. No. 4,443,414, used a microporous membrane to extract molybdenum from solutions containing molybdenum and other mineral ions. Lee et al., in U.S. Pat. No. 3,956,112, described a membrane solvent extraction system for general application based upon the use of a non-porous membrane. The membrane was solvent swollen, so that one of two substantially immiscible liquids which the membrane separated caused the membrane to swell, forming an intermediary zone through which diffusion of solute material could occur. Ho et al., in U.S. Pat. No. 3,957,504, used an ion-exchange membrane in the manner of Lee et al., to recover metal ions from an aqueous solution.

Because the above membrane solvent extraction systems involve the use of solvent-swollen membranes, they do not prevent the molecular diffusion of dissolved solvent into the aqueous phase. Furthermore, the membranes of the prior art systems show no permselectivity for the solutes to be removed. Instead, any selectivity observed is due to the choice of the extraction solvent or to the inclusion of chelating agents in the solvent that are selective for the metal ions that are to be extracted. Finally, the organic extraction solvents employed by Ho et al., and by Lee et al., would be quite unsuitable for the production of beverages such as low-alcohol wines, distilled spirits, and beers for the reason that even minor amounts of these solvents, when dissolved in the aqueous phase, would represent sometimes toxic and invariably unacceptable contaminants or adulterants in the beverage.

What is needed for the removal of ethanol and other low-molecular weight organic solutes from aqueous solutions of these solutes—and in particular, from alcoholic beverages—is a process with the following characteristics:

Ethanol should be removed as selectively as possible, i.e. with minimal simultaneous removal of water.

Ethanol should be removed in such a way that addition of water to the product (i.e., "reconstitution") is avoided. Neither deliberate addition of water (i.e., dilution) nor inadvertent addition of water (i.e., by direct osmosis or ultrafiltration of water into the beverage) should take place.

Most organic compounds present in the beverage other than ethanol should be retained in the beverage during ethanol removal to the greatest degree possible.

The extraction fluid that serves the purpose of receiving the ethanol extracted from the alcoholic beverage and subsequently carrying it away for further processing must either be such that its presence in the beverage is permissible at the concentration levels at which it will be found, or this fluid must be physically prevented from entering and thereby contaminating the alcoholic beverage that is being processed.

The invention described herein satisfies these criteria.

SUMMARY OF THE INVENTION

Methods are provided for the extraction of ethanol from alcoholic beverages through the use of membrane extraction. The extraction of ethanol from the beverage is accomplished in a preferred embodiment of the invention through the use of membranes in conjunction with ethanol-receiving extraction fluids that have the properties of absorbing permeated ethanol as it issues from the membrane while neither absorbing water from the beverage nor contributing additional water to the beverage. Additionally, the properties of the membranes and/or extraction fluids are chosen such that many of the other desirable organic constituents of the alcoholic beverage are not simultaneously co-extracted with the ethanol to an excessive degree. As a result, organic constituents of the alcoholic beverage which contribute to its aroma and flavor are retained, while the alcohol content of the beverage is selectively reduced. The finished reduced-alcohol product thus retains the flavor of the original alcoholic beverage but has an alcohol content that is about 30% to about 95% lower than that of the starting material.

In one embodiment, the extraction fluid is a non-toxic water-immiscible organic solvent in which ethanol has a solubility that is large compared to that of water. In another embodiment, the extraction fluid is an aqueous solution of a low-molecular-weight solute (e.g., an electrolyte such as sodium chloride, or a simple sugar such as glucose) that provides the solution with an osmotic pressure comparable to that of the alcohol-containing beverage on the opposite side of the membrane. In both instances, the membrane interposed between the beverage and the extraction fluid serves the purposes of (1) preventing the dispersion and entrainment of one fluid within the other and (2) controlling the exchange of components between the two fluids on either side of the membrane. In particular, while the membrane must be chosen to be permeable to ethanol, it need not be substantially impermeable to water, since the properties of the extraction fluid are such that water is prevented from permeating across the membrane and entering the extraction fluid.

Methods are also provided for the regeneration of the extraction fluid by thermal flash evaporation, by distillation, or by back extraction into an aqueous phase—which process optionally may be coupled with distillation. As a result of the methods of this invention, the extraction fluid is continually renewed. Thus, this fluid can be recycled.

BRIEF DESCRIPTION OF THE FIGURES

The present invention may be more readily understood by reference to the following figures, wherein.

DETAILED DESCRIPTION OF THE INVENTION

The methods of this invention effect the removal of a substantial portion of the alcoholic content of an alcoholic beverage, while at the same time retaining the other organic constituents of the beverage which contribute to its color, bouquet or aroma, and flavor. This latter aspect of the process is perhaps most critical in the production of "light" wines (approximately 6–8 volume % ethanol content) and so-called "non-alcoholic" wines (less than 0.5 volume % ethanol content). As shown in Amerine, "Wine," Kirk-Othmer Encyclopedia of Chemical Technology, Vol. 24, pp. 549–578 (3rd Ed. 1978), which is incorporated herein by reference, wine is a complex mixture of organic and inorganic compounds, many of which give the wine its character and taste. Any process for the removal of alcohol from wine should ideally minimize the loss of these constituents, and the present invention sustantially achieves this goal. The identity and concentrations of other (i.e., non-ethanol) organic constituents obviously are different for distilled spirits (e.g., whiskey) and for beer, but the nature of the separation problem is the same: namely the selective removal of ethanol in preference to water and these other organic constituents. For the sake of definiteness, the invention will be described in greatest detail for the case where the process is applied to the production of light wines.

Figure 1:
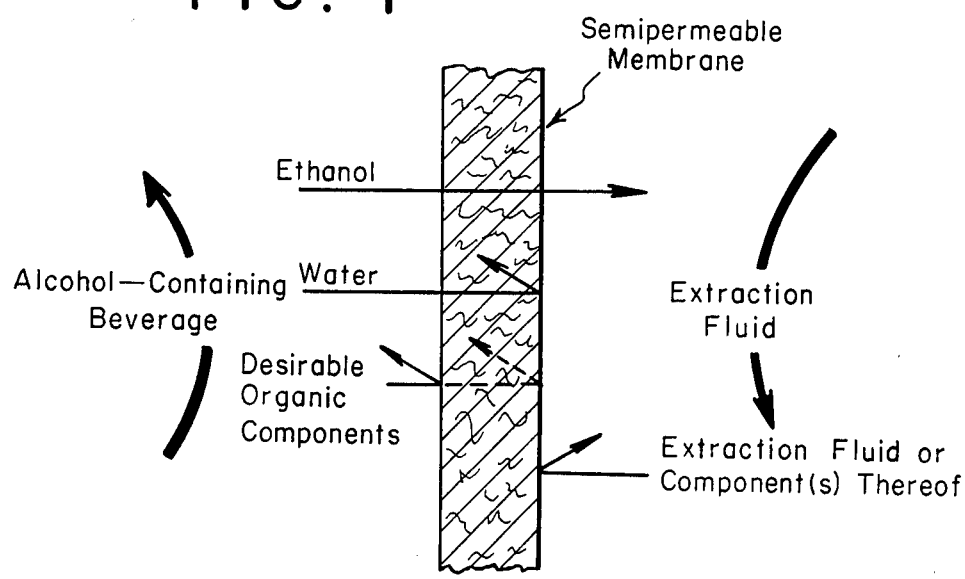
FIG. 1 is a schematic representation of the basic membrane extraction process, wherein an alcohol-containing beverage and an extraction fluid move, optionally but preferably in countercurrent fashion, on opposite sides of a permselective membrane, so that only ethanol permeates into the extraction fluid.

This invention causes the selective removal of ethanol from wine through a method that in its essentials is illustrated in FIG. 1. As shown, a semipermeable membrane 8 is interposed at the interface between wine that is to be processed and an appropriate extraction fluid. Because of its permselectivity, certain desirable organic components of the wine are unable to pass through the membrane and into the extraction fluid; additionally, the extraction fluid itself may exhibit a degree of selectivity for the preferential absorption of ethanol over the other, desirable organic components. In this manner, preferential removal of ethanol over other desirable organic solutes in the wine is realized.

A second aspect of the invention is its ability to selectively remove ethanol in preference to water. A distinguishing feature of this invention is that the membrane need not be selectively permeable to ethanol over water. Indeed, the overall process can exhibit remarkable ethanol/water removal selectivity, even when water would normally be capable of freely permeating the membrane along with ethanol. This performance results from the characteristics of the extraction fluid. In particular, the extraction fluid is chosen such that it does not absorb permeated water from the wine or other alcoholic beverage being treated, nor does the extraction fluid donate water to the alcoholic beverage.

The non-water-absorbing and non-water-exchanging characteristic of the extraction fluid may be provided in various ways. Two preferred classes of non-water-absorbing and non-water-exchanging extraction fluids are (1) water-immiscible organic solvents and (2) aqueous solutions of osmotic agents that exhibit osmotic pressures that are more or less balanced with or approximately equal to the osmotic pressure of the wine or other alcoholic beverage present on the opposite side of the intervening membrane. In the former case, significant quantities of water are not absorbed in extraction fluids of the water-immiscible organic solvent type because water has a very low solubility in these solvents, i.e., the concentration of water in the water-saturated organic solvent is low as compared to the concentration of ethanol taken up by the solvent under process operating conditions.

In the second case—namely, extraction fluids of the type that consist of aqueous solutions of osmotic agents—the extraction fluid exhibits the essential non-water-absorbing and non-water-exchanging characteristic not by virtue of immiscibility with water (since aqueous solutions and water are obviously miscible) but rather because little or no driving force for the permeation of water from the wine side to the extraction fluid side of the membrane exists when these mixtures have approximately the same osmotic pressure. This latter condition is achieved by adjusting the concentration of a solute such as a salt (e.g., NaCl) or sugar (e.g., glucose) in the aqueous extraction fluid.

By way of further explanation of the class of aqueous extraction fluids, it is noted that the osmotic pressure of water in a solution is directly related to the activity (and chemical potential) of water in that solution. Moreover, the diffusive permeation of a component across a membrane occurs only when a difference in the activity (or chemical potential) of that component is established across the membrane. Thus, when the osmotic pressure (and activities) of water on opposite sides of a membrane are in balance, no driving force exists to cause a flux of water across the membrane, regardless of how high the water permeability of that membrane might be.

Thus, if the osmotic pressure of water in the aqueous extraction fluid is significantly higher than the osmotic pressure of water in the alcoholic beverage being treated, then the activity of water in the beverage will be higher than that in the extraction fluid, and accordingly an undesirable transmembrane flux of water will occur from the alcoholic beverage into the extraction fluid, and water will be removed simultaneously with the ethanol. Conversely, if the osmotic pressure of water in the extraction fluid is lower than that in the beverage being processed (i.e., if the activity of water in the aqueous extraction fluid is higher than in the beverage), then an undesirable transmembrane flux of water will occur from the extraction fluid into the beverage, and dilution or adulteration of the alcoholic beverage with water will result. However, if the concentration of osmotic agent in the aqueous alcoholic beverage is chosen according to the process of the present invention such that the osmotic pressures of water in the streams on both sides of the membrane are substantially the same, then any transmembrane water flux will be held to a minimum. Obviously, the lower the permeability of the membrane to water, then the lower the water flux will be in response to any minor differences in osmotic pressure that may exist across the membrane.

PREFERRED EMBODIMENTS

Water-Immiscible Organic Solvents as Extraction Fluids

Figure 2:
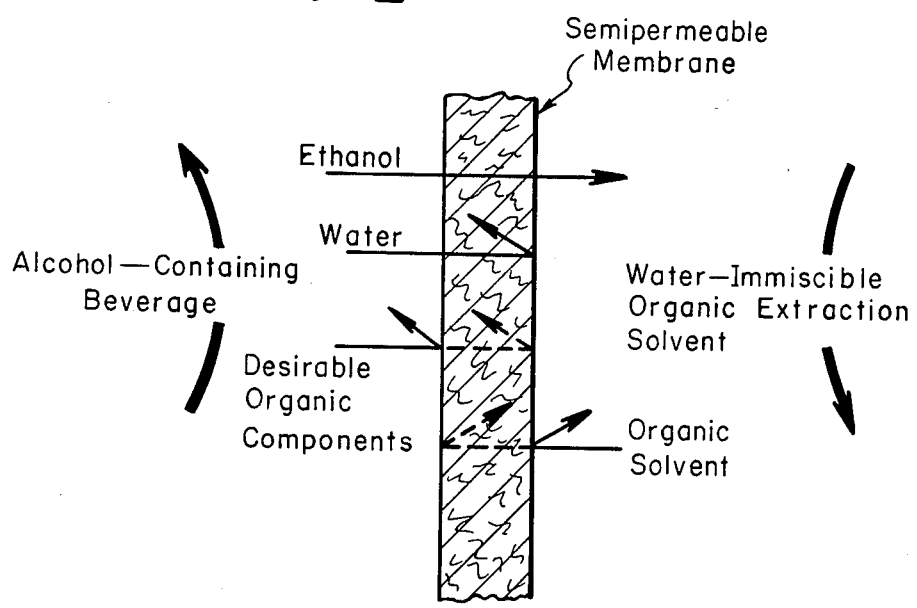
FIG. 2 is a schematic representation of the membrane extraction process of FIG. 1 wherein the extraction fluid is a water-immiscible organic solvent in which ethanol but not water has an appreciable solubility and which is prevented from entering and contaminating the beverage by the permselective membrane.

As shown in FIG. 2, a semipermeable membrane 8 is interposed at the interface between wine (or other alcoholic beverage) that is to be processed and an appropriate non-water-absorbing organic extraction solvent. Because of its permselectivity, certain desirable organic components of the wine (or other beverage) may be unable to pass through the membrane and into the extraction solvent. Additionally, the organic extraction solvent itself may exert a significant degree of selectivity for the preferential absorption of ethanol over other desirable organic compounds in the beverage.

It is important to note that although water can freely permeate the membrane along with the ethanol, the characteristics of the extraction solvent are such that the solubility of water in it is low relative to the solubility of ethanol and preferably is negligible. Hence, water is effectively excluded from the organic extraction solvent and is retained in the wine, despite the lack of membrane ethanol/water permselectivity.

By the same token, the organic extraction solvent is prevented from entering the wine or other alcoholic beverage being processed by one or more of several factors. On the one hand, organic solvents suitable for use as extraction fluids according to the process of the present embodiment of the invention will be water-immiscible, and such solvents invariably will exhibit limited solubilities in aqueous solutions such as wines, whiskeys, and beers. Accordingly, if dispersion and entrainment of the organic solvent phase within the aqueous wine phase are prevented by placing a permselective membrane at the interface that is impenetrable to one or the other of the phases in contact with it, then contamination of the alcoholic beverage by the organic extraction solvent will be limited to the molecular solubility of the solvent in water. Preferably, the membrane will be chosen to be impenetrable to the organic phase, thus serving as a barrier to its crossing over into the aqueous phase. As discussed in more detail below, relatively minor amounts of organic solvent may be tolerable in the alcoholic beverage, depending on the identity and concentration level of the solvent.

On the other hand, the extraction solvent may also be excluded on a molecular level from the membrane by a combination of large solvent molecular size and small effective membrane pore size, or by poor solubility of the organic solvent in the membrane material. Such membranes will serve either to impede or to prevent the molecular diffusion of organic solvent across them and into the alcoholic beverage being processed.

The movement of the wine or other beverage and the extraction solvent on their respective sides of the membrane is preferably countercurrent, to maximize the efficiency of ethanol extraction. However, other considerations (such as minimization of transmembrane hydrostatic or osmotic pressure differences) may dictate other flow configurations (e.g., cocurrent) in particular circumstances.

Figure 4:
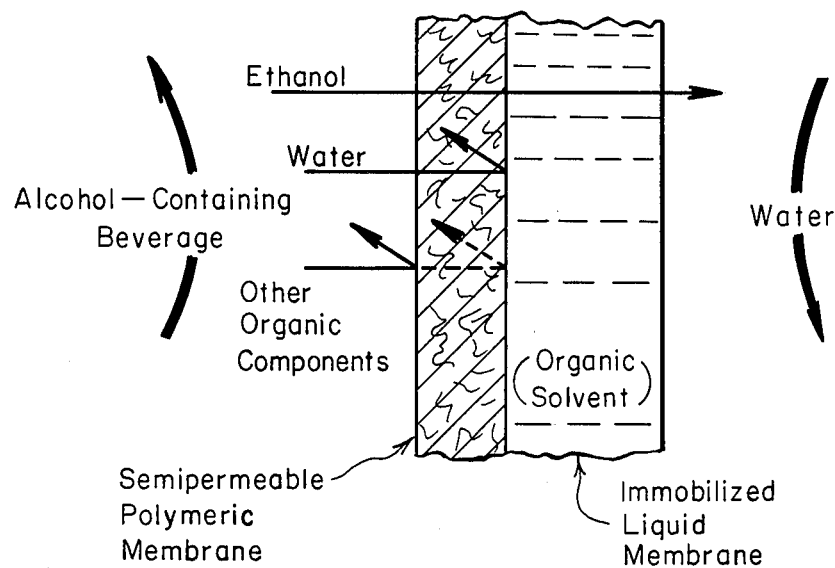
FIG. 4 is a schematic representation of a process for the extraction of ethanol from alcoholic beverages by means of a combination of a permselective membrane and an immobilized liquid membrane.

The exact geometry of the system is not critical to the invention, and indeed variations on the basic theme of FIGS. 1 and 2 may readily be envisioned. For example, in FIG. 4 a different arrangement is shown in which a bimembrane 25 is formed by positioning a permselective membrane 8 against an immobilized liquid membrane 20 (ILM) of one of the types disclosed by Robb and Reinhard in U.S. Pat. No. 3,335,545 which is incorporated herein by reference. In this instance, the ILM contains a water-immiscible organic extraction solvent for ethanol. Because the ILM has a hydrophobic microporous construction, the solvent remains in place once the microporous matrix is charged with solvent.

In operation, the free surface of the permselective membrane would be exposed to wine, while that of the ILM would contact water flowing in a countercurrent fashion. Ethanol from the wine would then selectively pass through the bimembrane into the water, where it would be recovered by appropriate means.

The advantages of this embodiment are compactness and simplicity. A disadvantage is that thin immobilized liquid films often exhibit limited stability, but this problem might be countered by periodic flushing of the exterior surface of the ILM with fresh organic extraction solvent.

Particular membranes and water-immiscible organic solvents suitable for the practice of this embodiment of the invention are discussed in a subsequent section.

Aqueous Solutions of Osmotic Agents as Extraction Fluids

Figure 3:
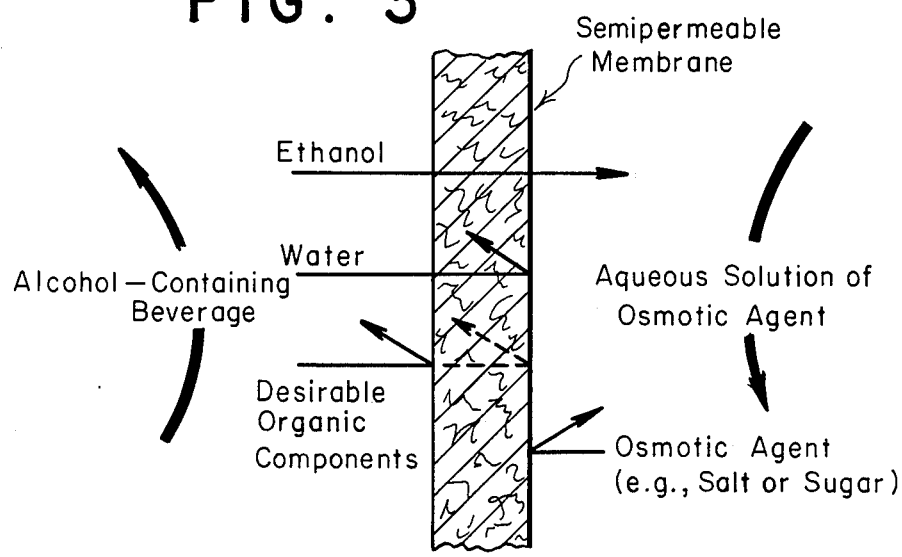
FIG. 3 is a schematic representation of the membrane extraction process of FIG. 1 wherein the extraction fluid is an aqueous solution of a membrane-impermeable osmotic agent (such as a salt or other low-molecular-weight solute), said agent being present at a concentration such that the osmotic pressure of the extraction fluid and of the alcohol containing beverage on opposite sides of the membrane are approximately in balance, thus preventing permeation of water from the beverage into the extraction fluid.

This embodiment of the invention causes the selective removal of ethanol from wine and other alcoholic beverages through a method that in its essentials is illustrated in FIG. 3. As in the previously described embodiment, a semipermeable membrane 8 is again interposed between the wine (or other alcoholic beverage) that is to be processed and an appropriately non-water-absorbing and non-water-exchanging extraction fluid, but in this case the latter comprises an aqueous mixture rather than an organic solvent. As before, the permselectivity of membrane 10 may either slow or sustantially prevent the passage and loss of certain desirable organic components of the beverage into the aqueous extraction fluid.

The aqueous extraction fluid of this embodiment differs, however, from the organic solvent of the previously described embodiment in the means by which substantial removal of water frcm the alcoholic beverage is prevented from occuring during ethanol removal. As discussed above, significant permeation of water across the membrane is prevented in the present embodiment by minimizing or eliminating the driving force for permeation, which is the difference in osmotic pressure (or water activity) on opposite sides of the membrane.

The osmotic pressure of water in an aqueous solution is determined by the concentration of dissolved solutes in the solution. In the case of a full-strength wine, the osmotic pressure of water is determined primarily by the concentration of ethanol because it is the most concentrated solute; however, other low-molecular-weight compounds present in wine at appreciable concentrations (e.g., sugars such as glucose and fructose, various carboxylic acids, etc.—see Amerine) also contribute to its osmotic pressure. The local osmotic pressure of wine (or other alcoholic beverage) being treated by the process of the present invention will thus be a function both of the initial wine composition and of the degree of ethanol removal that has been accomplished at a particular point in the process.

In order to minimize or eliminate the osmotic-pressure-difference driving force for permeation of water across the membrane, the concentration of osmotic agent in the aqueous extraction fluid is chosen such that the osmotic pressures of the two aqueous process streams—the wine or other beverage and the extraction fluid—are approximately in balance. Because the molar concentration of osmotic agent in the aqueous extraction fluid must be comparable (within a factor of two or three) to the total molar concentration of dissolved solutes in the beverage being treated if the osmotic pressures of the two aqueous solutions are to be in approximate balance, the osmotic agent will often be a low-molecular-weight compound with appreciable water solubility and for which osmotic pressure is known or can be calculated with reasonable accuracy as a function of concentration.

The present embodiment may also be distinguished from the former in terms of the relationship of the semipermeable membrane and the extraction fluid. In the present case, the aqueous solution of osmotic agent is at least a two-component mixture, e.g., water and a salt such as sodium chloride. However, it is critical to the operation of this invention only that the semipermeable membrane serve as a barrier to the permeation of but a single component of this mixture—namely, the osmotic agent; thus, the permeability of the membrane to water, the second component of the extraction fluid, is of less consequence—in fact, of no consequence if the osmotic pressures of both solutions are precisely matched. In contrast, in the previously described embodiment of the invention, the extraction fluid is initially comprised of a single membrane—permeable component—namely, the organic solvent (at least prior to its uptake of ethanol and other minor components of the beverage being treated).

Particular membranes and aqueous solutions of osmotic agents suitable for the practice of this embodiment of the invention are discussed below.

Non-Water-Absorbing and Non-Water-Exchanging Extraction Fluids

For organizational simplicity, suitable extraction fluids may be divided into two principal classes, which are discussed in turn.

Organic Extraction Solvents

From the standpoint of extraction efficiency, membrane compatibility, possible contamination of the wine and ease of ultimate recovery of the extracted ethanol, the organic solvent used in a membrane extraction process for the production of light wines or other alcohol-reduced beverages should ideally meet the following requirements:

(1) Any solvent selected should clearly be chemically compatible with ethanol and be capable of dissolving a significant amount of ethanol in it, yet it should be substantially immiscible with water. As noted above, most available membranes are not intrinsically ethanol/water permselective, and it is only through the utilization of a water-immiscible solvent that the solvent/membrane system exhibits the desirable overall ethanol/water selectivity. Furthermore, water immiscibility facilitates solvent regeneration by back-extraction of the ethanol in conventional liquid-liquid extraction equipment;

(2) The solvent should be substantially non-toxic in case there is some minor wine contamination or breakage and leakage of the membrane. Natural constituents of wine or solvents approved for food or pharmaceutical use or generally recognized as safe by the U.S. Food and Drug Administration are ideal in this regard;

(3) The distribution coefficient for the partitioning of ethanol between the organic and the aqueous phase should be as high as possible in order to minimize the required solvent volume and/or recirculation rate and to facilitate ethanol recovery and solvent regeneration;

(4) Solvent viscosity should preferably be low, to facilitate pumping and to enhance mass transfer efficiency;

(5) The boiling point of the solvent should be considerably higher than that of ethanol, if it is desired to recover the extracted ethanol from the solvent by single-stage flash or multi-stage distillation;

(6) The solvent should be compatible with membrane and hollow-filter module materials;

(7) The solvent should preferably be bulky and poorly soluble in the membrane material, to minimize the permeability of solvent and the possibility of solvent contamination of the alcoholic beverage. High-molecular-weight solvents are thus preferred over those of lower molecular weight. Similarly, cyclic or branched-chain compounds are preferred over those with straight-chains; and (8) The solvent should be relatively inexpensive.

Solvent requirements (1)–(3) are the most important, but the others are also desirable.

Illustrative of usable extraction solvents are the classes of the higher alcohols and esters that are naturally present in wine. Ethyl caprylate (ethyl octanoate), isopropyl myristate, 1-octanol, 1-decanol, and 1-dodecanol, are suitable examples of these classes. All have high boiling points of approximately 200° C. or greater at 760 mm Hg, low water solubilities, and relatively high molecular weights. The boiling point of the solvent should preferably be in the range of from about 100° to 250° C. if it is desired to employ thermal means for ethanol recovery and/or solvent regeneration. The molecular weights for octanol and its ethyl ester are 130.2 and 172.3, respectively, suggesting that their permeabilities through appropriate membranes would be low. The molecular weight of the solvent should preferably be greater than about 125, with the upper limit on molecular weight being determined by the increase in solvent viscosity (and hence process pressure drops and pumping costs) with molecular weight. In this regard, it is important to note that permeant molecular weight is not the sole determinant of its permeability through a particular membrane; solubility considerations (i.e., solubility of the permeant in the membrane material)

also arise when the membrane is a substantially non-porous one.

Other solvents which are not natural wine constituents might also be used, as long as they largely meet the above requirements. For example, members of the family of siloxane compounds may be employed. These compounds, of which the trimethylsiloxy-terminated polydimethylsiloxanes such as tetracosamethylundecasiloxane (molecular weight 829.83, boiling point 201° C. at 4.7 mm Hg) and cyclic polydimethylsiloxanes such as tetradecamethylcycloheptasiloxane (molecular weight 519.12, boiling point 154° C. at 20 mm Hg), are representative, are substantially non-toxic and stable.

In a determination of the partition coefficients for ethanol of some of these solvents and others, measured volumes of dilutions of 80 proof vodka (i.e., an aqueous solution containing 'volume percent ethanol) or wine (Gallo Reserve Chablis) were mixed with various measured volumes of the test solvents in graduated cylinders, and the volumes of the aqueous and organic phases were measured after phase separation had occurred. By this means, which ignores the relatively low degree of mutual solubility of water and the test solvents, the distribution coefficient of the ethanol between the phases was determined, albeit only in an approximate manner. For certain extraction solvents (e.g., isopropyl myristate and the silicone oils), the ethanol content of the aqueous phase after extraction was determined directly by measuring the boiling point of the ethanol/water mixture in a ebulliometer. The boiling point of the mixture can be related to the concentration of ethanol in the mixture. The experimental results are shown in Table 1.

TABLE 1

| Extraction Solvent | Aqueous-Phase Ethanol Concentration (Vol %)* | (M) | Organic-Phase Ethanol Concentration (M) | Partition Coefficient** |
|---|---|---|---|---|
| 1-Octanol (Aldrich 24,041-9) | 13.6+ | 2.34 | 2.33 | 1.00 |
| 1-Dodecanol (Aldrich 12,679-9) | 8.5 | 1.46 | 0.97 | 0.67 |
| Ethyl Caprylate (Aldrich 11,232-1) | 18.9+ | 3.23 | 0.47 | 0.14 |
|  | 28.6+ | 4.90 | 1.03 | 0.21 |
| Isopropyl Myristate (Malmstrom Chemical Corp.) | 10.0++ | 1.71 | 0.094 | 0.055 |
|  | 5.5 | 0.95 | 0.050 | 0.053 |
| Polydimethylsilicone oils, trimethylsiloxy-terminated: |  |  |  |  |
| Petrarch PS038 5.0 centistokes | 8.5++ | 1.46 | 0.222 | 0.015 |
| Dow-Corning 200 Fluid 350 centistokes | 7.7++ | 1.32 | 0.029 | 0.022 |
| Silicone Oil, melting-point grade (Aldrich 14,615-3) | 7.1+ | 1.21 | 0.40 | 0.40 |
|  | 32.7+ | 5.61 | 2.05 | 0.36 |
|  | 3.8++ | 0.66 | 0.14 | 0.21 |

*Vol % is the concentration of aqueous-phase ethanol after extraction.
**Partition Coefficient = [Ethanol]$_{organic}$/[Ethanol]$_{aqueous}$
+Measured by change in volumes of phases.
++Ethanol concentration measured directly by ebulliometer.

The data of Table 1 show that all of the solvents would be acceptable in terms of their ability to partition ethanol. The fact that even the silicone oils showed an appreciable partition coefficient is interesting in that silicone oils with viscosities greater than 350 centistokes are considered suitable for use in food processing by the Food and Drug Administration (FDA) in concentrations that do not exceed 10 ppm for "ingestion" and 20 ppm for "incidental contact." Furthermore, food-grade silicone oils are currently used in the wine industry as fermentation antifoam agents.

Moderate viscosity silicone fluids have the further advantage of virtual water insolubility, and they are available with molecular weights of about 10,000 daltons or more. As a result, they are not expected to cross the membranes of this invention to any significant degree. In fact, a very open membrane structure could be used without fear of permeation by such large silicon fluid molecules. Nevertheless, reasonably "tight" membranes might still be preferred in order to ensure that excessive amounts of desirable smaller molecular components of the wine would not be lost through coextraction with the alcohol.

Other solvents which may be suitable and which appear to be non-toxic, i.e., are on the FDA's "Generally Recognized as Safe" [GRAS] list or are natural constituents of wine, are as follows: tri-acetin (glyceryl triacetate) and tri-butyrin (glyceryl tributyrate) [both compounds are not known to be toxic and are found at high concentrations in some wines], allyl heptanoate [GRAS], amyl caprate [GRAS], 3,7-dimethyl-1-octanol [no known toxicity], ethyl acetate [GRAS], ethyl butyrate [GRAS], 1-hexanol [GRAS], palmitic acid [GRAS], linalool and linalyl acetate [both GRAS], ethyllinoleate or mandenol, methyl laurate [no known toxicity], and various esters (e.g., methyl, ethyl, and isopropyl) of fatty acids including myristic acid [which have no known toxicity]. Indeed, isopropyl myristate (IPM) is used in the manufacture of regenerated-cellulose artificial kidney membranes, where membrane-to-blood contact is involved, and it is used as an ingredient in various cosmetic and medicinal preparations. Additionally, it is a practically odorless liquid of low viscosity.

It should be noted that the choice of water-immiscible organic extraction fluids is not limited to pure or single-component solvents. For example, it may be advantageous to employ multicomponent mixtures or blends of compounds in order to achieve an optimum balance of extraction fluid properties. In addition, the organic extraction fluid need not necessarily be a liquid at room temperature. It may be a low-melting solid such as 1-dodecanol, which melts at about 26° C. This flexibility arises from the fact that the ethanol which partitions into the organic phase during operation of the membrane extraction process will tend to lower the melting point of the mixture, and furthermore operation of the ethanol extraction process at temperatures somewhat above ambient is possible.

Aqueous Solutions of Osmotic Agents

The design of non-water-absorbing and non-water-exchanging extraction fluids of this type is relatively straightforward. As discussed above, it is required that the osmotic pressures of water in the alcoholic beverage being processed and in the aqueous extraction fluid be roughly in balance, so that the latter neither absorbs large quantities of water from nor donates water to the alcoholic beverage. It should be noted that it is unnecessary, impractical, and uneconomic to precisely match osmotic pressures on both sides of the membrane at every point in the process, as local process stream compositions will vary with the extent of ethanol removal at a particular point in the process. While precise osmotic pressure matching represents the ideal to strive for, a more practical objective is to achieve an approximate balance of average osmotic pressures so that the net or average transmembrane water flux will be acceptably low.

Osmotic agents will typically be low molecular weight highly water soluble and non-toxic solutes—either organic or inorganic in nature—that, when dissolved in water, are capable of producing osmotic pressures in the range of the alcoholic beverage to be fed to the alcohol-reduction membrane extraction process. For example, electrolyte salts and sugars represent examples of suitable inorganic and organic osmotic agents, respectively. More specific examples of agents of these two subclasses are sodium chloride and glucose, respectively.

A requirement of this embodiment of the invention is that the membrane be substantially impermeable to the osmotic agent, thus preventing the latter from diffusing into and contaminating the alcoholic beverage being treated. For example, the maximum allowable concentration of sodium in wine varies from 40-80 ppm to about 100-500 ppm, depending on the ultimate destination of the wine and the pertinent regulations that apply, and concentrations typically are significantly lower (see Amerine). In contrast, the concentration of sodium chloride in an aqueous extraction fluid suitable for use with this invention (see below) will normally be one or several orders of magnitude higher than the tolerable level in wine, thus leading to the requirement for a high degree of membrane selectivity against sodium chloride permeation. Similar considerations apply in the case where the aqueous extraction fluid is a glucose/water mixture, since excessive transport of sugar from the extraction fluid across an insufficiently permselective membrane and into a wine would intolerably sweeten the wine. Fortunately, both silicone-based and reverse-osmosis membranes, among others, provide very effective barriers against salt and sugar permeation, as discussed below.

Osmotic pressure data are tabulated in standard references as a function of solute concentration for many aqueous solutions. Alternatively, the osmotic pressure of a candidate solution may be measured or calculated. For example, the osmotic pressure $\pi_i$ of component i can be calculated from the equation $$\pi_i = \frac{-RT}{\overline{V}_i} \ln(\gamma_i X_i)$$

where R is the gas constant (82.06 ml-atm/K-mol), T is temperature (°K), $\overline{V}_i$ is the molar volume of species i (18 ml/mol for water), $X_i$ is the mole fraction of species i in solution, and $\gamma_i$ is its activity coefficient. For sufficiently dilute solutions, the simpler van't Hoff equation applies:

$$\pi = C_s RT$$

where $C_s$ is the concentration of the solute in the solution (mol/ml).

Table 2 provides osmotic pressure data as a function of solute concentration for three solutes: ethanol, sodium chloride, and glucose. In order to determine the desired concentration of osmotic agent to be used in aqueous solution as the extraction fluid in a particular case, the first step is to determine the osmotic pressure of the alcoholic beverage being contacted across the membrane with the fluid. This pressure may be measured, calculated from the above equations, or estimated from the ethanol concentration of the beverage and the ethanol/water osmotic pressure data in Table 2 (provided that ethanol is the most concentrated solute and thus the most important determinant of the osmotic pressure of the beverage). The second step is to choose the identity of the osmotic agent, e.g., NaCl, glucose, or some other suitable solute. Finally, the amount of the latter to be mixed with water to form the extraction fluid is determined by matching osmotic pressures, i.e., by moving horizontally (and interpolating where necessary) in Table 2.

It will usually suffice to design the extraction fluid such that its osmotic pressure matches the average of the osmotic pressures of the full-strength feed beverage and the alcohol-reduced product. For example, if a dry feed wine containing 10.5 volume % ethanol is to be treated to produce a light wine containing 7.5 volume % ethanol, then the average ethanol content of the wine in the process will be 9 volume %, and its osmotic pressure from Table 2 will be approximately 38 atm. To match this osmotic pressure, an extraction fluid consisting of a 0.82 molal solution of sodium chloride in water could be employed.

TABLE 2

| Osmotic Pressures of Aqueous Solutions at 25° C. | | | |
|---|---|---|---|
| Ethanol Concentration* (volume %) | Osmotic Pressure (atm) | NaCl Concentration** (Molal) | Glucose+ Concentration (weight %) |
| 0.5 | 1.9 | 0.043 | 0.2 |
| 1.0 | 3.9 | 0.086 | 0.3 |
| 2.5 | 9.9 | 0.22 | 0.6 |
| 5.0 | 20.1 | 0.44 | 1.2 |
| 7.5 | 30.8 | 0.67 | 1.9 |
| 10.0 | 41.8 | 0.91 | 2.4 |
| 12.5 | 53.3 | 1.17 | 3.1 |
| 20 | 87.2 | 1.8 | 4.5 |
| 30 | 138 | 2.7 | 6.4 |
| 40 | 193 | 3.6 | 8.2 |
| 50 | 258 | 5.0 | 10.4 |

*Osmotic pressure vs. concentration data taken from Mehta, G. D., J. Memb. Sci., 12, p. 1-26 (1982).
**Data taken from Stoughton and Lietzke, J. Chem. Eng. Data, 10, p. 254 (1965).
+Data calculated from CRC Handbook of Chemistry and Physics, 55th edition. (CRC Press, Boca Raton, FL, 1974-75).

MEMBRANES FOR EXTRACTION OF ETHANOL

The use of a membrane precludes the mixing of the extraction fluid with the wine, an occurrence that attends ordinary liquid-liquid extraction. In ordinary liquid-liquid extraction, significant entrainment of the organic phase within the aqueous phase can and often does occur. Frequently, the amount of entrained organic solvent in the aqueous phase is considerably greater than the amount of solvent that is molecularly dissolved in the aqueous phase.

Such a degree of contamination of a wine or other alcoholic beverage with solvent would of course be unacceptable. To minimize the possibility of contamination by solvent, the membranes of the present invention are preferably non-porous or at least characterized by very fine pores, and they will not be highly swollen by solvent; thus, the transport of solvent across them will be impeded.

A number of other desirable membrane requirements have been enumerated above, including permselectivity between ethanol and other organic components of the beverage, solvent resistance in cases where an organic extraction fluid is employed, and impermeability to osmotic agents (e.g., salts such as NaCl or sugars such as glucose) in cases where an aqueous extraction fluid is employed.

Bearing these limitations in mind, a number of types of membranes have potential applicability in this invention, and the choice will be influenced by economic considerations, the nature of the extraction solvent selected, the solvent compatibility of the membrane, and its availability in high-surface-area configurations. For example, membranes constructed of crosslinked polymeric membrane materials or more loosely organized elastomeric materials are suitable Membranes that are now used for reverse osmosis (RO) are good candidates for use in this invention, because RO applications entail high transmembrane water fluxes. Membranes that permit rapid water permeation usually will be significantly permeable to ethanol as well.

Ethanol fluxes across both highly crosslinked polymeric membranes and more openly structured elastomeric or rubbery membranes are adequate for the present invention. For example, Schissel and Orth, *J. Memb. Sci.*, 17, 109 (1984), reported ethanol fluxes of about 0.4 cm/hr across crosslinked FT-30 (Film Tec) RO membrane, when used for pervaporation at ambient temperature in the presence of 90% ethanol. Smolders et al., *J. Memb. Sci.*, 16, 269 (1983), reported an ethanol permeation rate of about 0.013 cm/hr across a silicone-based elastomeric polydimethylsiloxane membrane during pervaporation at 20° C. in the presence of 50% ethanol. Finally, gel-type regenerated cellulose membranes of the type employed in kidney dialysis afford very high ethanol fluxes, inasmuch as the molecular weight of ethanol is significantly below the molecular-weight cut-off of these membranes. Typically, the diffusivity of ethanol in these membranes is approximately one-fifth of its diffusivity in free water.

Given adequate ethanol permeability, the next most important factor in the selection of a membrane is its perselectivity. Many of the organic components that it is desired to retain in a wine are alcohols, acids, and esters, some of which are much larger than ethanol (and hence relatively impermeable) and others of which are not appreciably larger in molecular size than ethanol. Nevertheless, suitable membranes may selectively block the permeation of some members even of the latter class of compounds because of the compounds' electrical charge, solubility characteristics in the membrane, or bulky side chain constituents.

Even in the case of chemically similar homologous alcohols, considerable permselectivity may be achieved through the use of appropriate membranes, as shown in Table 3. In this table, normalized alcohol fluxes have been calcalated from water flux and alcohol rejection data obtained in experiments wherein mixtures of individual alcohols in water were subjected to reverse-osmosis testing. Office of Water Research and Technology, Report No. PB 253,193 (April 1976).

TABLE 3

| Relative RO Fluxes of Low-Molecular-Weight Alcohols Across Polyurea and Polyamide Membranes* | | |
|---|---|---|
| | Alcohol Flux Relative to Ethanol** | |
| Alcohol | NS-100+ | NS-200+ |
| Ethanol | 1.00 | 1.00 |
| n-Propanol | 0.53 | 0.25 |
| n-Amyl Alcohol | 0.16 | 0.085 |

TABLE 3-continued

| Relative RO Fluxes of Low-Molecular-Weight Alcohols Across Polyurea and Polyamide Membranes* | | |
|---|---|---|
| | Alcohol Flux Relative to Ethanol** | |
| Alcohol | NS-100+ | NS-200+ |
| tert-Amyl Alcohol | 0.049 | 0.016 |

*Original water flux and alcohol rejection data are taken from: Office of Water Research and Technology, Report No. PB 253,193 (April, 1976).
**Conditions: 1000 ppm organic solute, 600–800 psi and 25° C.
+NS-100 and NS-200 are designations for interfacially-polymerized thin-film-composite membranes.

In view of the above considerations, a number of membrane types may be useful for the membrane extraction of wine, including but not limited to various aliphatic and aromatic polyamide and polyurea reverse-osmosis membranes (e.g., the NS-100/NS-101/FT-30-type thin-film-composite membranes of FilmTec and the polyamide fibers of Dupont's Permasep module), regenerated cellulose membranes, cellulose acetate membranes, cellulose triacetate hollow fibers (Dow Chemical), silicone rubber and various copolymers thereof (e.g., silicone/polycarbonate) in both self-supporting and composite or coated hollow-fiber geometries, crosslinked polyvinyl alcohol, polyacrylonitrile and its copolymers (these polymers being particularly resistant to solvent swelling), polybenzimidazole (Celanese), and polybenzimidazolone (Teijin).

While any membrane geometry is potentially applicable, a hollow-fiber module with its much greater effective surface area is preferable. The flow of alcoholic beverage may be directed through the lumen of the hollow fibers and the extraction solvent along the exterior shell of the fibers, or vice versa. The preferred configuration will depend on the pressure capability, wettability, and porosity of the fibers, as well as on the hydrodynamic and mass transfer characteristics of the modules containing them.

Preferred operating pressures will be dictated in part by membrane considerations. For example, if it is desired to operate in a "fail-safe" mode such that broken fibers or membrane defects do not lead to contamination of the alcoholic beverage being processed, then the process will be operated with the pressure of the alcoholic beverage stream being maintained slightly higher than that of the extraction fluid. On the other hand, if water is capable of being ultrafiltered across the membrane (e.g., as with regenerated cellulose membranes used in conjunction with water-immiscible organic extraction solvents), then it will be desirable to operate with a slightly higher pressure maintained on the organic phase to prevent an ultrafiltration flux of water. In any case, operating pressures will be as close to atmospheric as possible, consistent with membrane module and piping pressure drops. Accordingly, pressure differences across the membrane should be on the order of 0–10 psi and it is not likely they would exceed 25 psi in any circumstance.

EXTRACTION FLUID REGENERATION SYSTEMS

Figure 5:
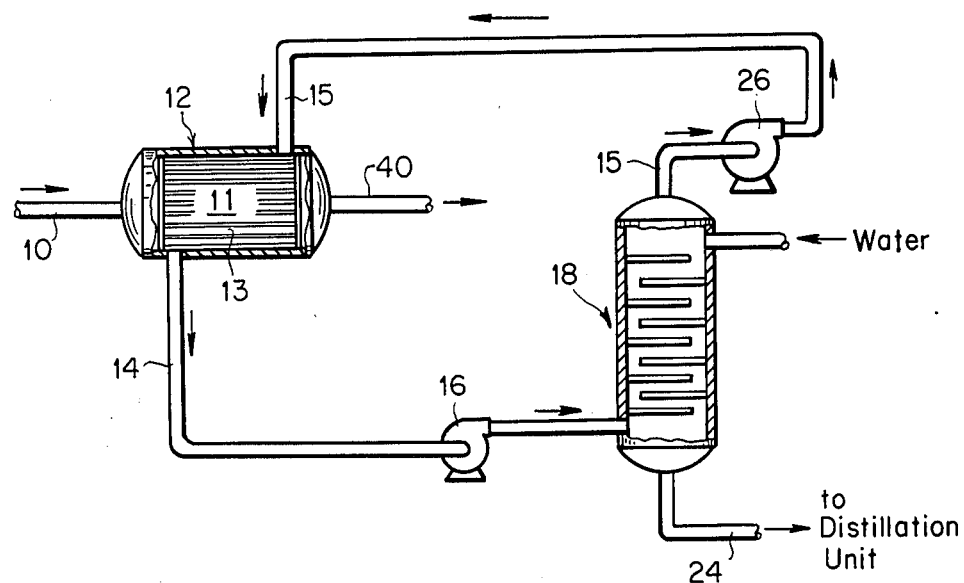
FIG. 5 is a schematic representation of the selective extraction of ethanol from an alcoholic beverage through a permselective membrane in a hollow-fiber module form, further showing recovery of the ethanol from the organic extraction solvent by a process of back-extraction into an aqueous phase followed by distillation.
Figure 6:
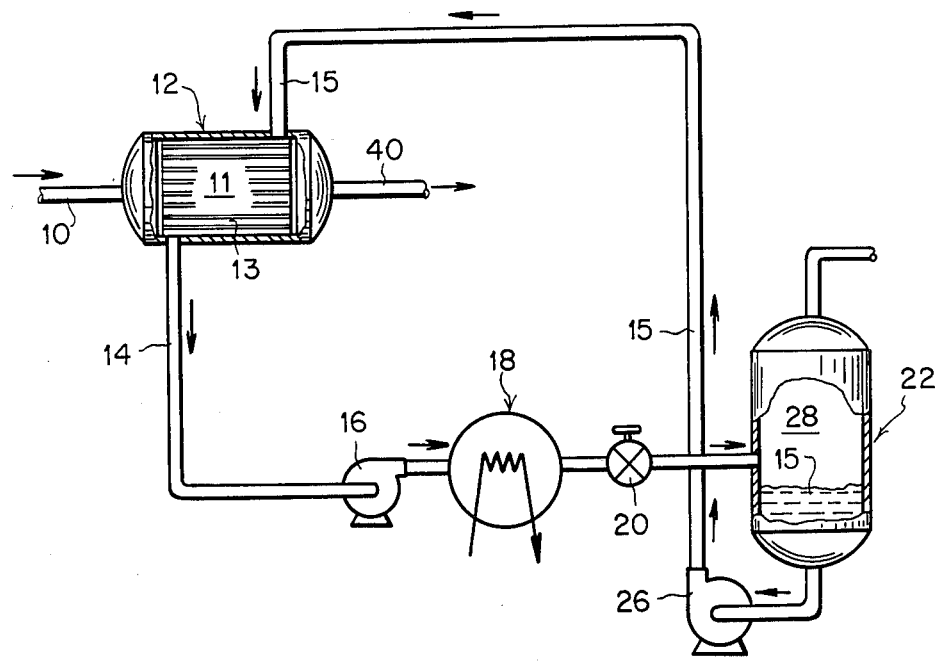
FIG. 6 is a schematic representation of the extraction of ethanol from an alcoholic beverage through a permselective membrane in a hollow-fiber module form, further showing recovery of the extracted ethanol from the organic extraction solvent by a process of single-stage thermal flash evaporation optionally assisted by the application of a vacuum.
Figure 7:
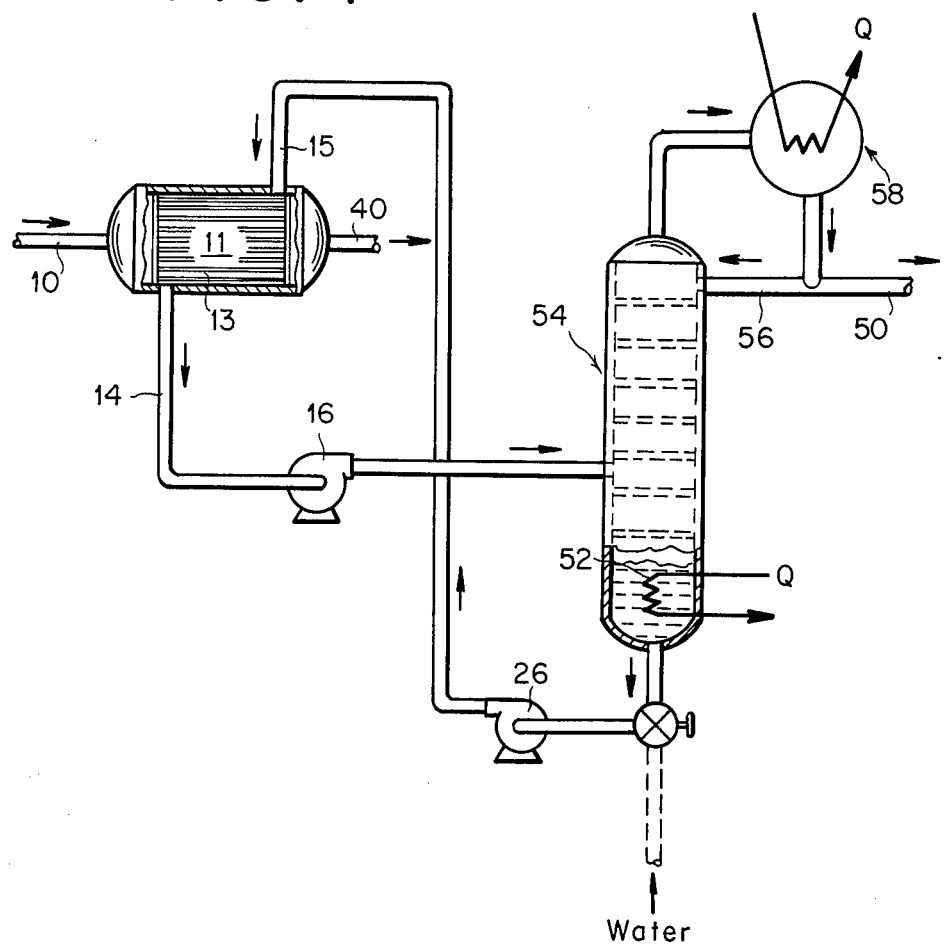
FIG. 7 is a schematic representation of the selective extraction of ethanol from an alcoholic beverage through a permselective membrane in a hollow-fiber form, further showing recovery of the ethanol from the aqueous solution of a non-volatile osmotic agent by a process of multistage distillation.

Once ethanol has been selectively extracted into a suitable extraction fluid, the ethanol must be removed from the fluid to recover the ethanol and to regenerate the extraction fluid for further use. Three methods for such fluid regeneration and solvent recovery are shown in FIGS. 5, 6, and 7. The methods of back-extraction and of single-stage flash evaporation depicted in FIGS.

5 and 6, respectively, are particularly suited to the regeneration of water-immiscible organic solvents, while the multi-stage distillation method of FIG. 7 is particularly suited to extraction fluids consisting of aqueous solutions of osmotic agents. However, other combinations of extraction fluids and regeneration methods are also workable. For example, if a high degree of recovered ethanol purity is not required, then a single-stage flashing process may be effective enough in recovering the ethanol and regenerating an aqueous extraction fluid, whereas a multi-stage distillation process might be required to recover a high-purity ethanol product in cases where a water-immiscible organic solvent having significant volatility was used as an extraction fluid. In all of these figures, hollow-fiber-module membrane systems are depicted for illustrative purposes, but the methods for solvent regeneration differ.

FIG. 5 depicts ethanol recovery and organic solvent extraction fluid regeneration via a back-extraction process, which is described as it might be applied to the production of low-alcohol wines. Beverage 10 whose ethanol content is to be reduced enters the lumina of hollow membrane fibers 11 contained in hollow fiber module 12, to emerge as a beverage of reduced ethanol content 40, which may be collected in a separate collection vessel. The removal of the ethanol from the beverage is effected by a relatively ethanol-free organic extraction solvent 15 that is introduced in countercurrent fashion into module 12. Solvent 15 flows around the exterior of hollow membrane fibers 11 and, during its passage through module 12, receives ethanol diffusing from beverage 10 within the hollow membrane fibers 11. During passage through module 12, solvent 15 thus becomes ethanol-enriched solvent 13, because of the continuing extraction process.

The degree of ethanol removal can be controlled by the choice of the organic solvent used, by varying the relative flow rates of the beverage and the solvent through the system, and by varying the ratio of wine flowrate to membrane area. For a given desired degree of ethanol removal, the minimum volumetric circulation rate of organic solvent can be calculated as the molar rate of ethanol removal from the beverage divided by the molar concentration of ethanol in the organic solvent that would exist were the solvent to be brought into phase equilibrium with the feed beverage. Thus, extraction solvents characterized by high organic:aqueous phase ethanol partition coefficients (see Table 1) can typically be circulated at flowrates that will be lower than those which must be used with low-partition-coefficient solvents. In this way, final ethanol concentrations of from about 0.4-0.5 to about 6-8 volume percent can be obtained in a light-wine product from a wine whose initial ethanol content typically is from about 10 to about 12 volume percent.

Ethanol-enriched organic solvent 13 emerging from module 12 could simply be collected in a separate collection vessel, but it is preferably transported through line 14 to back-extraction unit 18. Back-extraction of the ethanol-enriched solvent 13 may be carried out by conventional liquid-liquid contacting equipment, including but not limited to plate columns (as shown), packed columns, mixer-settlers, and centrifugal contactors. Should it be desirable to rigorously exclude the organic extraction solvent from the ethanol/H$_2$O mixture 24 which emerges from back-extraction unit 18, this may be accomplished by employing a second membrane solvent extraction module similar to module 12.

Ethanol/H$_2$O mixture 24 emerging from back-extraction unit 18 is then sent to a conventional distillation unit 30 for recovery of the ethanol. Substantially ethanol-free organic solvent 15 is removed from the back-extraction unit 18 by pump 26 and is returned to hollow-fiber module 12, for the extraction of further incoming beverage 10 whose ethanol content is to be reduced.

An alternative thermal solvent regeneration method is shown in FIG. 6. There, the extraction of the beverage is carried out in a manner identical to the method of FIG. 5 employing an organic solvent extraction fluid. Again, the ethanol-enriched solvent 13 could simply be collected in a separate collection vessel, but it is preferably fed through line 14 by pump 16, and then through process heater 18 and pressure-reduction valve 20 into flash vessel 22. Process heater 18 may be, for example, an electrical or steam heater, a heat exchanger, or some other heat source operated at a temperature sufficiently high to cause the vapor pressure of ethanol in ethanol-rich solvent 13 to exceed the prevailing pressure in single-stage flash vessel 22. A vacuum pump 32 (not shown) may optionally be provided to reduce the pressure in flash vessel 22 and, hence, the operating temperature of process heater 18.

During the passage of ethanol-enriched solvent 13 through pressure-reduction valve 20 into flash vessel 22, a vapor stream 28 of ethanol, which is relatively volatile (b.p. 78.5° C.), is formed which passes through the top of flash vessel 22, optionally through vacuum pump 32, and thence to condenser 34 (preferably water cooled), where it is recovered in liquid form. The much less volatile relatively ethanol-free organic solvent 15, which preferably has a boiling point no lower than about 100° to 150° C. if the system is operated at atmospheric pressure, remains in the liquid phase. Relatively ethanol-free organic solvent 15 is then returned through line 17 by pump 26 to the hollow-fiber module 12, for further incoming beverage extraction. To the extent that trace or minor amounts of dissolved water are present in the organic solvent 13, along with the ethanol, then these small quantities of co-extracted water may also be flashed from the extraction solvent in the process.

The back-extraction process of FIG. 5 is relatively simple, and it does not subject the extraction solvent to elevated temperatures. It does, however, increase the load on the ethanol distillation equipment. In contrast, the thermal solvent regeneration process of FIG. 6 exposes the solvent (and any organic components of the wine that may be co-extracted with ethanol) to elevated temperatures of at least about 85° to 100° C. Thus, undesirable decomposition reactions in the solvent or reactions involving co-extracted organic compounds might occur. The thermal regeneration process is advantageous, however, in that any non-volatile organic compounds co-extracted from the wine will accumulate in the extraction solvent. As a result, the mass action effect would tend to reduce the rate of further co-extraction of such compounds from the wine.

FIG. 7 depicts a multi-stage distillation process for ethanol recovery and extractant regeneration that is particularly useful when the extraction fluid is an aqueous solution of a non-volatile osmotic egent, e.g., NaCl in water. The extraction step is conducted substantially in the manner of FIG. 5 and 6 as before. For example, if the aqueous extractant and alcohol beverage flow countercurrently to one another, then the flow rate of aqueous extractant (e.g., brine) will be set to at least equal the product of the flowrate of the alcoholic beverage being treated times the fractional removal of ethanol that is desired from the beverage. Now, however, pump 16 delivers the ethanol-rich extractant 13 to the multi-stage distillation column 54, which is provided with an electrically- or steam-heated bottoms reboiler 52 and an overhead condenser 58, preferably water-cooled. Fractionation takes place in distillation column 54, which may be either of the packed or plate type, with an ethanol/water mixture exiting overhead to be condensed in condenser 58 and split into a reflux stream 56 to be returned to the column and an ethanol-rich product stream 50. The bulk of the water and substantially all of the nonvolatile osmotic agent make their way to the bottom of the column and to reboiler 52 (of either the external or the internal variety, the latter being shown in the figure). The regenerated low-ethanol aqueous extraction fluid collected as the column bottoms product is subsequently recycled to the extraction unit via pump 26.

Because ethanol and water form an azeotropic mixture, the ethanol-rich product stream 50 will typically contain at least a few volume percent of water. This relatively small quantity of water may either be coextracted with ethanol from the wine or other alcoholic beverage being processed by maintaining the average osmotic pressure of the aqueous extraction fluid at a level slightly higher than that of the alcoholic beverage being treated, or a small stream of make-up water 60 may be introduced anywhere into the extraction fluid circulation loop, e.g., preferably at the inlet of pump 26.

It is obvious that the processes of FIGS. 5, 6, and 7 are just as applicable to ethanol recovery and extraction fluid regeneration in the production of reduced-alcohol distilled spirits (e.g., whiskeys) and beers as they are to the production of low-alcohol wines.

Examples of the practice of the invention are as follows. In each of Examples 1–19, regenerated cellulose hollow-fiber membrane modules containing 1.5 m² of effective membrane surface area were employed; these modules were obtained both from Extracorporeal, Inc. (their "ExCel 1.5 M" module) and from Asahi Medical (their "AM-300M" unit). These hollow-fiber membranes are characterized by urea, creatinine, and Vitamin $B_{12}$ clearances of 183, 165, and 59 ml/min, respectively, as measured at blood and dialysate flow rates of 200 and 500 ml/min. These membrane modules are further characterized by their ultrafiltration flux coefficient of 6.4 ml/hr·mm Hg. In Example 20, a polyamide reverse osmosic membrane available commercially as "FT-30" was used, and silicone-rubber-based polymer and copolymer membranes were employed in Examples 21–29. The latter types of membranes are described in greater detail below.

EXAMPLE NOS. 1–9

In each of the Examples Nos. 1–9, the membrane extraction process utilized regenerated cuproammonium cellulose formed into four modules of hollow fiber membranes, each containing 1.5 square meters surface area. Two modules were used to extract alcohol from wine and two modules were used to back extract alcohol into a water stream. Wine was pumped by a peristaltic pump from a holding vessel through a prefilter, thence to the lumen side of the two wine extractors A and B, which were connected in series, and finally through a postfilter to a collection vessel where the light wine product was stored. The feed wine and the light wine product were maintained at 5°–10° C. The microporous membrane prefilters and postfilters used were characterized by nominal pore sizes of either 0.2 or 0.45 microns.

The extraction fluid was pumped from a chilled holding vessel through the shell side of both wine extractors in a split stream in parallel and countercurrent to the wine flow. In these examples, the extraction fluid was a water-immiscible organic solvent, Petrarch Silicone Oil, 5 centistoke viscosity, pumped at a rate of 1800 ml/min. The extraction fluid flowed from the wine extractors, in a split stream, to the lumen side of two back extractors C and D, connected in parallel and in countercurrent flow to the back extraction fluid. At this point, the extraction fluid flowed back to the holding vessel. The back extraction fluid was pumped from a holding vessel to the shell side of back extractors D and C, respectively, in series, then to waste. Connections between the extractor and back-extractor modules were arranged such that the extraction fluid exiting extractor A was directed to back-extractor C, whereas extraction fluid from extractor B was directed to back-extractor D. In Examples Nos. 1–9, the back extraction fluid was deoxygenated, deionized water, pumped at a flow rate of 100 ml/min.

The approximate ethanol content in volume percent of the feed wine and the light wine product, the flow rate, in milliliters per hour, and the quantity of light wine produced in liters are set forth in Table 4. The wines used in Examples Nos. 1–9 were a dry base wine derived from the Thompson grape, California Zinfandel, a California dry red base wine obtained from Bronco Winery, Gallo French Colombard, Gallo Johannesburg Riesling, Carlo Rossi Burgundy, a Chablis base wine obtained from Paul Masson Vineyards, Carlo Rossi Burgundy, and Paul Masson's St. Regis base wine, respectively.

TABLE 4

| Example No. | Feed Wine (%) | Light Wine (%) | Wine Feed Flow Rate (ml/hr) | Quantity Produced (l) |
|---|---|---|---|---|
| 1 | 11.8 | 3.1 | 575 | 54 |
| 2 | 9.7 | 3.0 | 550 | 13 |
| 3 | 11.5 | 2.8 | 500 | 13 |
| 4 | 10.8 | 7.4 | 900 | 0.75 |
| 5 | 10.4 | 7.2 | 900 | 0.75 |
| 6 | 12.3 | 6.8 | 950 | 7.2 |
| 7 | 12.0 | 0.49 | 250 | 17.5 |
| 8 | 12.0 | 0.54 | 225 | 7.0 |
| 9 | 12.0 | 0.33 | 240 | 15.6 |

EXAMPLE NO. 10

The extraction process was carried out following the sane procedure as in Example No. 1; however, some modifications were made to collect back extractor fluid for recovery of ethanol. The flow pattern of the Paul Masson Chablis feed wine (11.9 vol % ethanol) was the same as in Example No. 1. The identities of the extraction fluid and the back extraction fluid were the same as in Example No. 1; however, flow rates and patterns were different in this case. The extraction fluid was directed through the wine extractors A and B and two back extractor modules C and D as in Example No. 1, but before entering the two back extractors C and D the extraction fluid from extractor A first entered the lumen side of a third back extractor E. After back-extraction, the extraction fluid was returned to a holding vessel for reuse. The extraction fluid flow rate was 1300 ml/min.

Back extractor fluid flowed through the shell side of this third back extractor E at a flow rate of only 200 ml/hr, thus producing a back-extraction fluid stream containing a relatively high concentration of ethanol that facilitated its subsequent recovery. A separate stream of back extractor fluid also flowed through the shell side of back extractor D and thence into the shell side of back extractor C in series and then to waste. The flow of wine and extraction fluid was countercurrent, as was the flow of extraction fluid and back extraction fluid.

In this manner, the alcohol content of approximately six liters of 11.9 vol. % feed wine was reduced to 0.53 vol. % at a feed wine flowrate of 230 ml/hr. Approximately 4.7 liters of 5.25 vol. percent ethanol content back extraction fluid was collected from back extractor C, and 100 ml. of 96.5 vol. percent ethanol was recovered from three liters of this collected back extraction fluid by distillation.

EXAMPLE NO. 11

The extraction process was carried out following substantially the same procedure as in Example No. 1, but with some modifications made to facilitate recovery of the extracted ethanol by distillation. As before, the feed wine (a Paul Masson Chablis containing 11 volume percent ethanol) was directed at a flowrate of 425 ml/hr through the lumen sides of two hollow-fiber membrane extractors A and B connected in series with one another and each containing 1.5 $m^2$ of active membrane area. As in Example No. 1, a stream of 1800 ml/min of Petrarch Silicone Oil, 5 centistokes, was split into two streams and made to flow in parallel through the shell side of the two extractor modules, countercurrent to the flow of wine.

Ethanol-rich extraction fluid from the first extractor module A was directed to the lumen side of a first back-extractor module C, where its ethanol content was reduced by countercurrent back extraction with water. The ethanol-rich extraction fluid from extractor module B was similarly directed to a second back-extractor module D. The combined extraction fluid streams exiting back-extractor modules C and D were subsequently made to flow through the lumen side of a third back-extractor module E, and thence to the extraction fluid reservoir. A stream of deoxygenated, deionized water at a flowrate of 425 ml/hr was employed as the back-extraction fluid. It flowed in series through the shell sides of back extractors E, D, and C, in that order, countercurrent to the direction of the extraction fluid flows.

In this manner, 24.8 liters of a light wine product containing approximately 4.5 vol. % ethanol were produced from the 11 vol. % ethanol Chablis wine used as the feed material. A portion of the extracted ethanol was recovered from the aqueous back-extraction fluid by batch distillation of the latter, which contained ethanol at a concentration of approximately 5.0 vol. % prior to the distillation recovery step. The first portion of distillate collected, which weighed 1.1 kg, contained ethanol at the azeotropic concentration of about 96.5 vol. %.

EXAMPLE NO. 12

The extraction process was carried out following the same procedures and using the same system configuration as in Example No. 11. In this case, a St. Regis base wine obtained from the Paul Masson Vineyards and containing about 10.3 vol. % ethanol was fed through the two extractors at a flowrate of 125 ml/hr. Aqueous back-extraction fluid was passed through the three back-extractor modules at a flowrate of 250 ml/hr, and a 5 centistoke Petrarch silicone oil extraction fluid was circulated between the extractor and back-extractor modules as before at a flowrate of 1800 ml/min.

At these operating conditions, the ethanol content in the light wine product was reduced to 0.73%, with 22.7 liters of product being collected. Aqueous back-extraction fluid, which contained about 4.3 vol. % ethanol upon exiting the last of the three back-extractor modules, was subjected to batch distillation to recover a 0.6 kg sample of an alcohol-rich product overhead that was analyzed to contain 94 vol. % ethanol.

In each of Examples 1-12, the reduced-alcohol wine product retained many of the desirable characteristics of the starting material. Moreover, processed wines were noticeably free of objectionable odors and tastes of the sort that arise in the application of conventional evaporative techniques for ethanol reduction.

EXAMPLE NO. 13

The extraction process was carried out following the same procedure as Example No. 1. The membrane was regenerated cuproammonium cellulose hollow fiber, utilizing two 1.5 $m^2$ surface area modules, one as a wine extractor and one as a back extractor. The wine flowed through the lumen side of a heated wine extractor countercurrent to the flow of extraction fluid. The alcohol-containing feed beverage was a dry base wine produced by Bronco Winery from the Thompson grape that contained 11.7 vol. percent ethanol content. This alcohol content was reduced by flowing it through the system at a flow rate of 100 ml/min. The extraction fluid was dodecanol, which was recirculated through the shell side of the wine extractor to the lumen side of the back extractor at a flow rate of 1000 ml/min. The extraction fluid was heated to 36° C. The back extraction fluid was warm tap water that flowed through the shell side of the back extractor countercurrent to the extraction fluid at a flow rate of 450 ml/min.

The low-alcohol wine produce produced in this manner contained 5.6 vol. percent ethanol. Although a characteristic dodecanol odor was detectable in this ethanol-reduced product wine, the latter was substantially free of contamination by droplets of dodecanol dispersed in the aqueous product.

EXAMPLE NO. 14

The extraction process was carried out using the same apparatus and following the same procedure as Example No. 13. The alcohol-containing beverage was a Thompson dry base wine having a 11.7 vol. percent ethanol content which was reduced to 2.87 vol. percent ethanol content at a wine feed flow rate of 43 ml/min. The extraction fluid was dodecanol and was subjected to the same conditions used in Example No. 13. The back extraction fluid and method was the same as Example No. 13, but the back extraction fluid flow rate was 575 ml/min. Flows were countercurrent through both the wine extractor and back extractor.

EXAMPLE NO. 15

The extraction process was carried out using substantially the same procedure and the identical apparatus as in Examples No. 1-9. In particular, four 1.5 m² regenerated cellulose hollow-fiber membrane modules were employed—two as extractors and two as back extractors—in the same configuration as described in Examples No. 1-9.

A commercially available wine—Gallo Reserve Dry Chablis—was used as the feed wine to the process; it was found by analysis to initially contain 11.0 vol. % ethanol. The extraction fluid consisted of isopropyl myristate (Eastman Kodak No. 10328), which was circulated between the extractors, back-extractors, and reservoir at a flowrate of 800 ml/min. Aqueous back-extraction fluid (deoxygenated and deionized water) was directed sequentially through the two back-extractor modules at a flowrate of 1000 ml/hr.

When feed wine was fed to the above process at a flowrate of 1000 ml/hr, its ethanol content was reduced from 11.0 to 5.1 vol. %. Approximately 750 ml of alcohol-reduced product wine was subjected to evaluation for taste and bouquet by organoleptic analysis. Isopropyl myristate could not be detected in the product wine in this manner.

EXAMPLE NO. 16

A commercially available Gallo French Columbard wine was fed to the apparatus of Example No. 15 and treated in precisely the same manner, using isopropyl myristate extraction fluid and aqueous back-extraction fluid flowrates of 800 ml/min and 1000 ml/hr, respectively. At a feed wine flowrate of 250 ml/hr, its alcohol content was reduced to a value of about 0.4% as determined by ebulliometry, and again any presence of isopropyl myristate in the product wine was undetected when the latter was subjected to taste testing.

EXAMPLE NO. 17

The extraction process was carried out using the same apparatus and following the same procedure as in Example same apparatus and following No. 1. The alcohol-containing beverage was Seagrams Seven Crown Whiskey (40.0 vol. percent ethanol) which was reduced to 17.7 vol. percent ethanol content at a feed flowrate of 1000 ml/hr. The flow rate of silicone oil extraction fluid was 1800 ml/min. and that of the aqueous back extraction fluid was 100 ml/min. Flow patterns were the same as in Example No. 1.

In this example, about one liter of whiskey was processed. The product retained its distinctive whiskey character; the brown color of the feed whiskey darkened significantly during the process of ethanol removal, evidently due to concentration in the product of certain color bodies (e.g., various congeners) initially present in the feed whiskey and rejected by the permselective membrane.

EXAMPLE NO. 18

The extraction system was modified to accomodate light whiskey processing with collection of back extraction fluid and subsequent recovery of ethanol therefrom. The membrane was regenerated cuproammonium cellulose hollow fiber in the form of four 1.5 m² surface area modules, two of which were used as whiskey extractors and two as back extractors. In this example, the alcohol-containing feed beverage was 80 proof (40 vol. %) Seagrams Seven Crown whiskey, which was pumped at a flowrate of 650 ml/hr from a holding vessel to the shell side of two whiskey extractors A and B, connected in series, and then to a light whiskey product collection vessel. The whiskey was at room temperature and no filtration was used. The extraction fluid was Petrarch Silicone Oil, 5 centistoke viscosity, which was pumped from a holding vessel through the lumen side of both whiskey extractors A and B in a split stream, in parallel configuration and countercurrent to the whiskey flow. The flow rate of extraction fluid was about 800 ml/min. Upon leaving the whiskey extractors, the extraction fluid streams were mixed and subsequently sent through the lumen side of back extractors C and D sequentially to a holding vessel. The back extraction fluid was deoxygenated, deionized water, which flowed in series through the shell side of both back extractors D and C, in that order, countercurrent to the flow of extraction fluid. The back extraction fluid flow-rate was 1000 ml/hr, and this stream was collected for ethanol recovery.

In this example, about 1.1 liters of light whiskey product was produced which was analyzed to contain 22.8 vol. % ethanol. About 100 ml. of 95.9 vol. percent ethanol was recovered from three liters of collected back extraction fluid by batch distillation.

EXAMPLE NO. 19

In this example, a whiskey component ultimately destined for incorporation into a blended whiskey was obtained from Joseph E. Seagram and Sons, Inc., and subjected to the ethanol reduction process using the same apparatus and procedures used in Example No. 18 above. The nominal alcohol content of the whiskey feed was 80 proof (40 vol. % ethanol). A 5 centistoke viscosity silicone oil (polydimethylsiloxane, trimethylsiloxy terminated, Petrarch Systems No. PS 038) was employed as the extraction fluid. It was circulated at a flowrate of 1800 ml/min. Deoxygenated, deionized water at a flowate of 930 ml/hr was used as the back-extraction fluid.

At a whiskey feed flowrate of 600 ml/hr, 14.6 liters of a light whiskey product containing approximately 18.6 vol. % ethanol were produced. The reduced-alcohol product retained many of the characteristics of the feed whiskey. A portion of the collected back-extraction fluid was subsequently subjected to batch distillation for ethanol recovery, and by this means two enriched-ethanol product cuts containing about 96 and 88 vol % ethanol were withdrawn from the top of a packed distillation column in quantities of 3.0 and 1.0 liters, respectively. Significantly, the ethanol-reduced back-extraction fluid remaining after this distillation recovery step (and typically still containing about 2.2 vol. % ethanol) was not adversely affected by the elevated temperature associated with distillation, as evidenced by its complete lack of color or off-tastes. Thus, the distilled back-extraction fluid is suitable for recycle to the ethanol-reduction process.

EXAMPLE NO. 20

In this example, the membrane was a commercially available composite, reverse-osmosis membrane of the same general type as those membranes shown in Table 3 and prepared by the technique of interfacial polymerization. Specifically, it consisted of a thin, aromatic polyamide barrier layer (produced by the reaction of an aromatic diamine like m-phenylene diamine with a triacyl chloride like trimesoyl chloride) deposited atop a microporous polysulfone support film. A membrane of this type designated FT-30 was obtained from Film Tec Corporation of Minneapolis, Minn. A flat-sheet sample of this membrane having a 170.3 cm² surface area was mounted in a 174 cm² (nominal) picture-frame test cell. The alcohol-containing feed beverage was a commercially available Gallo French Colombard wine having an analyzed feed ethanol content of 10.4 vol. percent. The extraction fluid was a 0.82 molar NaCl brine solution designed to be osmotically balanced with a wine containing approximately 9 vol. % ethanol, on average (see Table 2). A quantity of 560 ml of wine was recirculated from a holding vessel, blanketed with N₂, and passed through the test cell at a flow rate of 7.2 ml/min. At the same time, brine solution was passed through the test cell, on the opposite side of the FT-30 membrane, at a flow rate of 43.6 ml/min. Operation was at ambient temperature. After about 18 hours of wine recirculation on one side of the FT - 30 membrane, a sample of wine was analysed by ebulliometry and found to contain 8.1 vol. percent ethanol. The low-alcohol wine product was then subjected to taste testing with a particular view to determining whether contamination of the treated wine with NaCl from the aqueous extraction fluid (i.e., brine stream) had occurred. No significant salt contamination of the reduced-alcohol wine could be discerned in this manner, thus verifying the integrity and relative salt-impermeability of the FR-30 membrane employed.

EXAMPLE NOS. 21–29

In each of Examples No. 21-29, the membrane was a flat sheet of a silicone rubber, having an active membrane surface area of 10.47 square centimeters. This membrane was clamped at one end of a stirred, cylindrical diffusion cell and further secured to the sealing surface with Dow Corning HV silicone grease. The "outer" membrane surface was exposed to a large volume (several gallons) of extraction fluid in a stirred bath. The extraction fluid consisted of an aqueous solution of 0.82 molal NaCl, a salt concentration chosen such that the osmotic pressure of the extraction fluid would match the average osmotic pressure of a feed wine initially containing 11 vol. % ethanol and subsequently treated to reduce its alcohol content to 7 vol. % (i.e., having an average ethanol concentration of 9 vol. %—see Table 2). In each case, the test cell was charged with 65 milliliters of wine and placed in the brine solution, with the wine in the diffusion cell being constantly stirred by a magnetic stirrer.

The approximate ethanol content in volume percent of the initial wine charge and light wine product, the time the wine was stirred, the identities of the various membranes employed and the temperatures are set forth in Table 5. In each of Examples 21-29, the feed wine was a commercially available Gallo Reserve Dry Chablis. Membrane A was a dimethyl silicone rubber membrane, 1 mil thick, obtained from General Electric Co. (No. FB-0148). Membranes B and C, also obtained from General Electric Co. were 1-mil-thick films, consisting of silicone/polycarbonate copolymers containing 52% (No. MA568) and 42% (No. MA581) dimethyl silicone by weight, respectively.

From the concentration-vs.-time data of Table 5, the effective diffusivities $D_{eff}$ of ethanol through these membranes can be calculated from the expression $$D_{eff} = \frac{lv(C_o/C)}{At}$$

Where
l = membrane thickness,
v = initial volume of wine charge,
$C_o$ = initial ethanol concentration in wine,
C = initial ethanol concentration,
A = membrane area, and
t = time.

TABLE 5

| Example No. | Ethanol Content (Vol. %) Initial | Ethanol Content (Vol. %) Final | Time (hrs) | Approximate Temperature (°C.) | Membrane |
|---|---|---|---|---|---|
| 21 | 11.15 | 9.5 | 25 | 25 | A |
| 22 | 11.15 | 6.45 | 74 | 25 | A |
| 23 | 11.15 | 3.4 | 163 | 25 | A |
| 24 | 10.9 | 10.1 | 48 | 25 | B |
| 25 | 10.9 | 6.0 | 119 | 25 | B |
| 26 | 10.9 | 4.5 | 336 | 25 | B |
| 27 | 10.9 | 9.18 | 120 | 5 | B |
| 28 | 10.9 | 9.98 | 112 | 25 | C |
| 29 | 10.9 | 9.59 | 198 | 25 | C |

Effective ethanol diffusivities estimated in this manner for membranes A, B, and C at 25° are approximately $3 \cdot 10^{-8}$, $1-2 \cdot 10^{-8}$, and $3 \cdot 10^{-9}$ cm²/sec, respectively, these values decreasing with increasing polycarbonate content (and with decreasing temperature) as expected. Given suitably thin membranes (e.g., one to several microns) prepared from these materials, anticipated ethanol fluxes across such membranes are estimated to be sufficient for the practice of this invention. Significantly, wine treated in the manner of Examples 21-29 was not noticeably salty, thus verifying the integrity and relative salt impermeability of the silicone-based membranes employed.

As will be apparent to those skilled in the art, many modifications and variations of this invention may be made without departing from its spirit end scope. The specific embodiments described herein are offered by way of example only, and the invention is limited only by the terms of the appended claims.

What is claimed:

1. A method for producing from a first alcoholic beverage a second beverage of reduced volume percent alcohol content comprising the steps of:
   providing a membrane which is alcohol-permeable,
   feeding said first beverage across a first side of said membrane,
   feeding a water-immiscible organic solvent extraction fluid selected from the group consisting of ethyl caprylate, 1-octanol, 1-decanol, 1-dodecanol, isopropyl myristate, and a polydimethylsiloxane across a second side of said membrane, said extraction fluid being alcohol-absorbing but substantially not water-absorbing,
   said membrane preventing contamination of the alcoholic beverage on said first side of the membrane by the extraction fluid,
   whereby alcohol diffuses from the first beverage through the membrane into the extraction fluid to produce said second beverage on the first side of the membrane and an alcohol-enriched extraction fluid on said second side of the membrane.

2. The method of claim 1 wherein the membrane is made of one selected from the group consisting of aliphatic polyamide, aliphatic polyurea, aromatic polyamide, aromatic polyurea, regenerated cellulose, cellulose acetate, cellulose triacetate, silicone rubber, silicone-copolymer, silicone-polycarbonate, cross-linked polyvinyl alcohol, polyacrylonitrile, polyacrylonitrile-copolymer, polybenzimidazole and polybenzimidazolone.

3. The method of claim 1 in which the membrane is in a hollow-fiber module form, one of the first beverage and the extraction fluid is fed through the lumen of fibers of the membrane and the other of said first beverage and the extraction fluid is fed exterior to the fibers.

4. The method of claim 1 wherein the membrane is permselective against at least a component of the extraction fluid.

5. The method of claim 1 wherein the membrane is permselective against at least a component of the first alcoholic beverage.

6. The method of claim 1 wherein the membrane is permselective against molecules substantially larger than ethanol.

7. The method of claim 1 in which the alcohol-enriched extraction fluid is regenerated by liquid-liquid extraction.

8. The method of claim 1 wherein the extraction fluid is an organic solvent further comprising the steps of:
feeding the alcohol-enriched extraction fluid to a back-extraction unit,
extracting alcohol from the alcohol-enriched fluid to produce substantially alcohol-free organic solvent and alcohol-enriched water; and
recycling the substantially alcohol-free organic solvent to extract alcohol from further incoming first beverage.

9. The method of claim 1 in which the alcohol-enriched extraction fluid is regenerated by flash evaporation or distillation.

10. The method of claim 1 wherein the extraction fluid is an organic solvent further comprising the steps of:
feeding the alcohol-enriched extraction fluid to a heater to produce a mixture of alcohol and substantially alcohol-free organic solvent;
flashing the mixture across a pressure-reduction valve into a flash tank to vaporize the alcohol, while leaving the substantially alcohol-free organic solvent in liquid form; and
recycling the substantially alcohol-free organic solvent to extract further incoming first beverage.

11. The method of claim 1 in which the first beverage is a wine having an initial ethanol content of from about 9 to about 13 volume percent and the ethanol content of the second beverage is from about 0.5 to 8.0 volume percent.

12. The method of claim 1 wherein the first beverage is a beer or a distilled spirits.

13. The method of claim 1 in which the degree of alcohol removal from the first beverage is controlled by varying the flow rate of the beverage stream across the membrane relative to the flow rate of the extraction fluid.

14. The method of claim 1 in which the degree of alcohol removal from the first beverage is controlled by varying the membrane area.

15. A method for producing a beverage of reduced volume percent alcohol content comprising the steps of:
feeding the beverage whose volume percent alcohol content is to be reduced and water across opposite sides of a bi-membrane assembly comprising an immobilized liquid membrane in intimate apposition to a perselective membrane,
which immobilized liquid membrane is charged with an organic solvent that is alcohol-absorbing but substantially not water-absorbing, and
which permselective membrane is alcohol-pemeable and perselective against permeation by at least some component of the organic solvent and which is in contact with the beverage whose volume percent alcohol content is to be reduced,
whereby alcohol diffuses from the beverage through the bi-membrane assembly into the water to produce a beverage of reduced volume percent alcohol content and alcohol-enriched water and
separately collecting the beverage of reduced volume percent alcohol content and said alcohol-enriched water.

16. The method of claim 15 in which the immobilized liquid membrane is periodically recharged by flushing a surface with the same organic solvent with which it is charged.

17. A method for producing a beverage of reduced volume percent alcohol content comprising the steps of:
feeding a beverage whose volume percent alcohol content is to be reduced and an aqueous solution of an osmotic agent said osmotic agent being a low-molecular-weight water-soluble solute, across oposite sides of a membrane,
which membrane is alcohol-permeable and permselective against permeation by the osmotic agent,
whereby alcohol diffuses from the beverage through the membrane and into the aqueous solution to produce a second beverage of reduced volume percent alcohol content and an alcohol-enriched aqueous solution and
separately collecting the second beverage of reduced volume percent alcohol content and the alcohol-enriched aqueous solution.

18. The method of claim 17 wherein the osmotic pressure of the aqueous solution is approximately the same as the average osmotic pressure of the beverage whose alcohol content is to be reduced and the beverage of reduced alcohol content.

19. The method of claim 17 wherein the membrane is made of a silicone-rubber-based material or a membrane of the type commonly used for reverse osmosis.

20. The method of claim 17 wherein alcohol is removed from the alcohol-enriched aqueous solution by distillation to leave a low-alcohol aqueous solution which is recycled as the aqueous solution of an osmotic agent.

21. The method of claim 17, wherein the pressure difference across the membrane is less than 25 psi.

22. The method of claim 17 wherein the osmotic agent is sodium chloride or glucose.

23. A method for producing from a first alcoholic beverage a second beverage of reduced volume percent alcohol content comprising the steps of:
providing a membrane which is alcohol-permeable,
feeding said first beverage across a first side of said membrane,
feeding an extraction fluid across a second side of said membrane said extraction fluid being an aqueous solution of an osmotic agent said osmotic agent being a low-molecular weight water-soluble solute
said membrane also permselective against said osmotic agent thereby preventing contamination of the alcoholic beverage on said first side of the membrane by the extraction fluid, whereby alcohol diffuses from the first beverage through the membrane into the extraction fluid to produce said second beverage on the first side of the membrane and an alcohol-enriched extraction fluid on said second side of the membrane.

24. The method of claim 23 wherein the extraction fluid is an aqueous solution of an osmotic agent further comprising the steps of:

feeding the alcohol-enriched extraction fluid to a distillation column, distrilling alcohol from the alcohol-enriched fluid to produce an alcohol-enriched fluid and a low-alcohol aqueous extraction fluid, and recycling the low-alcohol aqueous extraction fluid to extract alcohol from further incoming first beverage.

25. The method of claim 23 wherein the osmotic agent is sodium chloride or glucose.

26. The method of claim 23 wherein the membrane is made of one selected from the group consisting of aliphatic polyamide, aliphatic polyurea, aromatic polymide, aromatic polyurea, regenerated cellulose, cellulose acetate, cellulose triacetate, silicone rubber, silicone-copolymer, silicone-polycarbonate, cross-linked polyvinyl alcohol, polyacrylonitrile, polyacrylonitrile-copolymer, polybenzimidazole and polybenzimidazolone.

27. The method of claim 23 in which the membrane is in a hollow-fiber module form, one of the first beverage and the extraction fluid is fed through the lumen of fibers of the membrane and the other of said first beverage and the extraction fluid is fed exterior to the fibers.

28. The method of claim 23 wherein the membrane is permselective against at least a component of the first alcoholic beverage.

29. The method of claim 23 wherein the membrane is permselective against molecules substantially large than ethanol.

30. The method of claim 23 in which the alcohol-enriched extraction fluid is regenerated by liquid-liquid extraction.

31. The method of claim 23 in which the alcohol-enriched extraction fluid is regenerated by flash evaporation or distillation.

32. The method of claim 23 in which the first beverage is a wine having an initial ethanol content of from about 9 to about 13 volume percent and the ethanol content of the second beverage is from about 0.5 to 8.0 volume percent.

33. The method of claim 23 wherein the first beverage is a beer or a distilled spirits.

34. The method of claim 23 in which the degree of alcohol removal from the first beverage is controlled by varying the flow rate of the beverage stream across the membrane relative to the flow rate of the extraction fluid.

35. A method for producing from a first alcoholic beverage a second beverage of reduced volume percent alcohol content comprising the steps of:

providing a bi-membrane assembly which is alcohol-permeable comprising an immobilized liquid membrane and a permselective membrane, which immobolized liquid membrane is charged with an organic solvent that is alcohol-absorbing but substantially not water-absorbing and which permselective membrane is alcohol permeable and permselective against at least a component of said organic solvent, feeding said first beverage across said permselective membrane of said bi-membrane assembly, feeding an extraction fluid across said immobolized liquid membrane side of said bi-membrane assembly, said extraction fluid being alcohol-absorbing but substantially not water-absorbing, said bi-membrane assembly preventing contamination of the alcoholic beverage on said permselective side of the bi-membrane assembly by the extraction fluid, whereby alcohol diffuses from the first beverage through the bi-membrane assembly into the extraction fluid to produce said second beverage on the first side of the bi-membrane assembly and an alcohol-enriched extraction fluid on said second side of the bi-membrane assembly.

36. The method of claim 35 wherein the permselective membrane is made of one selected from the group consisting of aliphatic polyamide, aliphatic polyurea, aromatic polyamide, aromatic polyurea, regenerated cellulose, cellulose acetate, cellulose triacetate, silicone rubber, silicone-copolymer, silicone-polycarbonate, cross-linked polyvinyl alcohol, polyacrylonitrile, polyacrylonitrile-copolymer, polybenzimidazole and polybenzimidazolone.

* * * * *